(12) United States Patent
Jiang et al.

(10) Patent No.: US 11,412,443 B2
(45) Date of Patent: Aug. 9, 2022

(54) METHOD FOR SEARCHING FOR NETWORK BY TERMINAL, TERMINAL, AND STORAGE MEDIUM

(71) Applicant: HUAWEI TECHNOLOGIES CO., LTD., Shenzhen (CN)

(72) Inventors: Yinqing Jiang, Wuhan (CN); Xiaojian Liu, Wuhan (CN); Bei Dai, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/978,843

(22) PCT Filed: Jul. 28, 2018

(86) PCT No.: PCT/CN2018/097699
§ 371 (c)(1),
(2) Date: Sep. 8, 2020

(87) PCT Pub. No.: WO2019/192107
PCT Pub. Date: Oct. 10, 2019

(65) Prior Publication Data
US 2020/0413324 A1    Dec. 31, 2020

(30) Foreign Application Priority Data

Apr. 4, 2018    (CN) .......................... 201810301295.4

(51) Int. Cl.
*H04W 48/16*    (2009.01)
*H04W 8/18*    (2009.01)
(Continued)

(52) U.S. Cl.
CPC ........... *H04W 48/16* (2013.01); *H04W 8/183* (2013.01); *H04W 72/0453* (2013.01); *H04W 72/085* (2013.01)

(58) Field of Classification Search
CPC . H04W 48/16; H04W 8/183; H04W 72/0453; H04W 72/052
(Continued)

(56) References Cited

U.S. PATENT DOCUMENTS 6,947,408 B1 *   9/2005   Liberti ................ H04B 7/0613
                                                        370/230
7,023,979 B1 *   4/2006   Wu ..................... H04M 3/5233
                                                        379/265.11
(Continued)

FOREIGN PATENT DOCUMENTS

CN          1784060 A       6/2006
CN          101188835 A     5/2008
(Continued)

OTHER PUBLICATIONS

Wang Peng et al, "Research on dual mode dual sim card negative control terminal based on 4G technology", Electronic Engineering and Product World, 2016, with an English Abstract, total 5 pages.
(Continued)

*Primary Examiner* — Hai V Nguyen
(74) *Attorney, Agent, or Firm* — Maier & Maier, PLLC

(57) ABSTRACT

Embodiments provide a method for searching for a network by a terminal, a terminal, and a storage medium, which reduce network search time. A terminal controls a first wireless communications module to search a first band for a first camping frequency channel number and controls a second wireless communications module to search a second band for a second camping frequency channel number. Therefore, compared with the prior art in which both the first wireless communications module and the second wireless communications module search a full band for a network, the embodiments can accelerate a network search process of the terminal. If the first wireless communications module finds a to-be-camped-on frequency channel number that
(Continued)

meets a preset condition, the terminal shares the to-be-camped-on frequency channel number found by the first wireless communications module with the second wireless communications module, thus shortening a network search time of the second wireless communications module.

18 Claims, 8 Drawing Sheets

(51) Int. Cl.
  *H04W 72/04* (2009.01)
  *H04W 72/08* (2009.01)
(58) Field of Classification Search
  USPC .......................................................... 455/509
  See application file for complete search history.

(56) References Cited

U.S. PATENT DOCUMENTS

| | | | | |
|---|---|---|---|---|
| 7,433,297 | B2* | 10/2008 | Barton | H04B 7/0613 370/207 |
| 8,121,601 | B2* | 2/2012 | Huang | H04W 48/16 455/436 |
| 8,200,225 | B2* | 6/2012 | Huang | H04W 36/00835 455/436 |
| 8,331,307 | B2* | 12/2012 | Bui | H04L 5/0053 370/330 |
| 8,725,200 | B2* | 5/2014 | Roh | H04W 48/16 455/552.1 |
| 8,909,290 | B2* | 12/2014 | Ruvalcaba | H04W 8/183 455/558 |
| 9,161,245 | B2* | 10/2015 | Suzuki | H04W 24/02 |
| 9,210,691 | B2* | 12/2015 | Ponukumati | H04W 52/0245 |
| 9,220,028 | B2* | 12/2015 | Suzuki | H04W 24/10 |
| 9,301,180 | B2* | 3/2016 | Suzuki | H04W 24/10 |
| 9,326,292 | B2* | 4/2016 | Cattoni | H04W 72/08 |
| 9,386,626 | B1* | 7/2016 | Hsu | H04J 13/00 |
| 9,402,274 | B1* | 7/2016 | Rajurkar | H04W 76/15 |
| 9,497,705 | B2* | 11/2016 | Nayak | H04W 8/183 |
| 9,730,149 | B2* | 8/2017 | Feng | H04W 8/183 |
| 9,922,340 | B1* | 3/2018 | Vaver | G06Q 30/0242 |
| 9,998,980 | B2* | 6/2018 | Youn | H04W 48/08 |
| 10,064,130 | B2* | 8/2018 | Tambaram Kailasam | H04W 40/005 |
| 10,334,596 | B2* | 6/2019 | Li | H04L 45/24 |
| 10,477,455 | B2* | 11/2019 | Youn | H04W 48/08 |
| 10,779,231 | B2* | 9/2020 | Chen | H04W 48/16 |
| 10,785,804 | B2* | 9/2020 | Park | H04L 27/2607 |
| 10,834,761 | B2* | 11/2020 | Park | H04W 74/006 |
| 2003/0129971 | A1* | 7/2003 | Gopikanth | H04W 48/18 455/414.1 |
| 2005/0100120 | A1* | 5/2005 | Barton | H04L 27/2601 375/347 |
| 2009/0010214 | A1* | 1/2009 | Bui | H04L 5/0053 370/329 |
| 2009/0086672 | A1* | 4/2009 | Gholmieh | H04W 48/14 370/329 |
| 2009/0088154 | A1* | 4/2009 | Umatt | H04W 48/16 455/434 |
| 2010/0255843 | A1* | 10/2010 | Huang | H04W 36/00835 455/436 |
| 2010/0273524 | A1 | 10/2010 | Bae et al. | |
| 2012/0115486 | A1* | 5/2012 | Huang | H04W 48/16 455/437 |
| 2012/0149419 | A1* | 6/2012 | Roh | H04W 48/16 455/515 |
| 2013/0053049 | A1* | 2/2013 | Al Housami | H04W 72/04 455/452.1 |
| 2014/0056250 | A1* | 2/2014 | Cattoni | H04W 72/042 370/329 |
| 2015/0264640 | A1* | 9/2015 | Feng | H04W 8/183 455/558 |
| 2016/0021520 | A1* | 1/2016 | Gudu Gantla | H04W 4/90 455/404.1 |
| 2017/0118758 | A1* | 4/2017 | Li | H04W 72/0453 |
| 2017/0289898 | A1* | 10/2017 | Youn | H04W 48/14 |
| 2018/0070303 | A1* | 3/2018 | Tambaram Kailasam | H04L 69/28 |
| 2018/0262973 | A1* | 9/2018 | Youn | H04W 64/00 |
| 2018/0270649 | A1* | 9/2018 | Tsai | H04W 8/183 |
| 2019/0149365 | A1* | 5/2019 | Chatterjee | H04L 25/0226 370/329 |
| 2019/0261424 | A1* | 8/2019 | Park | H04W 72/085 |
| 2019/0261425 | A1* | 8/2019 | Park | H04L 1/0026 |
| 2019/0268840 | A1* | 8/2019 | Chen | H04W 72/10 |
| 2019/0357261 | A1* | 11/2019 | Cirik | H04W 76/27 |
| 2021/0007152 | A1* | 1/2021 | Park | H04W 76/27 |
| 2021/0050904 | A1* | 2/2021 | Cirik | H04W 74/006 |
| 2021/0058974 | A1* | 2/2021 | Park | H04W 76/27 |
| 2021/0176791 | A1* | 6/2021 | Cirik | H04W 72/042 |

FOREIGN PATENT DOCUMENTS

| | | |
|---|---|---|
| CN | 101217743 A | 7/2008 |
| CN | 101657003 A | 2/2010 |
| CN | 102036350 A | 4/2011 |
| CN | 102065521 A | 5/2011 |
| CN | 103313227 A | 9/2013 |
| CN | 104159276 A | 11/2014 |
| CN | 104427577 A | 3/2015 |
| CN | 104918300 A | 9/2015 |
| CN | 105682084 A | 6/2016 |
| CN | 106102037 A | 11/2016 |
| CN | 106332227 A | 1/2017 |
| CN | 106413048 A | 2/2017 |
| CN | 106465464 A | 2/2017 |
| CN | 107105478 A | 8/2017 |
| WO | 2008/008102 A1 | 1/2008 |
| WO | 2018/044618 A1 | 3/2018 |

OTHER PUBLICATIONS

TSG S1 (00)369, "New Abbreviations and Definitions for R99, language alignment and editorial changes", TSG-SA Working Group 1 (Services) meeting #8, Beijing, China Apr. 10-14, 2000, total 41 pages.

* cited by examiner

METHOD FOR SEARCHING FOR NETWORK BY TERMINAL, TERMINAL, AND STORAGE MEDIUM

CROSS-REFERENCE TO RELATED APPLICATIONS

This application is a National Stage of International Patent Application No. PCT/CN2018/097699 filed on Jul. 28, 2018, which claims priority to Chinese Patent Application No. 201810301295.4, filed on Apr. 4, 2018. All of the aforementioned applications are incorporated herein by reference in their entities.

TECHNICAL FIELD

An exemplary embodiment relates to the communications field, and, to a method for searching for a network by a terminal, a terminal, and a storage medium.

BACKGROUND

In real life, an increasing quantity of users have more than one mobile phone number. A terminal manufacturer launches a dual-SIM terminal based on a user requirement. The dual-SIM terminal includes two card slots, so that a user inserts two subscriber identity module (SIM) cards of the same operator or different operators into the same terminal. In addition, the two SIM cards may be on standby at the same time.

Each SIM card of a current terminal corresponds to one modem, a SIM card 1 corresponds to a modem 1, and a SIM card 2 corresponds to a modem 2. When the terminal is powered on for the first time to search for a network or searches for a network during roaming, the modem 1 and the modem 2 respectively initiate network search and registration of the SIM card corresponding to the modem 1 and those of the SIM card corresponding to the modem 2. When the terminal including the two SIM cards searches for a network, the modem 1 corresponding to the SIM 1 searches a full band supported by the terminal for a network, and the modem 1 corresponding to the SIM 2 also searches the full band supported by the terminal for a network. Consequently, network search times of the two SIM cards in the terminal are long.

SUMMARY

Embodiments provide a method for searching for a network by a terminal, a terminal, and a storage medium, so as to resolve a technical problem of a long network search time caused by redundancy in an existing network search process.

According to a first aspect, a method for searching for a network by a terminal is provided. The method may be applied to a terminal including a first wireless communications module and a second wireless communications module.

In the method, the terminal controls the first wireless communications module to search a first band for a first camping frequency channel number and controls the second wireless communications module to search a second band for a second camping frequency channel number. Further, if the first wireless communications module finds a to-be-camped-on frequency channel number that meets a preset condition, the terminal shares the to-be-camped-on frequency channel number with the second wireless communications module.

In the foregoing method, the terminal controls the first wireless communications module to search the first band for the first camping frequency channel number and controls the second wireless communications module to search the second band for the second camping frequency channel number. Compared with the prior art in which both the first wireless communications module and the second wireless communications module search a full band for a network, the solution provided in this embodiment can accelerate a network search process of the terminal.

Further, if the first wireless communications module finds the to-be-camped-on frequency channel number that meets the preset condition, the terminal shares the to-be-camped-on frequency channel number found by the first wireless communications module with the second wireless communications module. In this way, a network search time of the second wireless communications module can be shortened.

Correspondingly, if the second wireless communications module finds a to-be-camped-on frequency channel number that meets a preset condition, the terminal shares the to-be-camped-on frequency channel number found by the second wireless communications module with the first wireless communications module. In this way, a network search time of the first wireless communications module can also be shortened.

In a possible embodiment, before controlling the first wireless communications module to search the first band for the first camping frequency channel number and controlling the second wireless communications module to search the second band for the second camping frequency channel number, the terminal controls the first wireless communications module to search frequency channel numbers included in a historical frequency channel number set for the first camping frequency channel number, and controls the second wireless communications module to search the frequency channel numbers included in the historical frequency channel number set for the second camping frequency channel number. The historical frequency channel number set includes a first historical frequency channel number of the first wireless communications module and a second historical frequency channel number of the second wireless communications module.

In this embodiment, the first wireless communications module in the terminal searches for the first camping frequency channel number based on both the first historical frequency channel number and the second historical frequency channel number. Compared with a prior-art solution in which each wireless communications module searches only a historical frequency channel number of the wireless communications module for a camping frequency channel number, in this embodiment, the first wireless communications module may search for the first camping frequency channel number based on more pieces of known frequency channel number information. In this way, the first wireless communications module is more likely to find the first camping frequency channel number as quickly as possible, so that a network search speed of the first wireless communications module can be shortened. In addition, the first wireless communications module shares the found to-be-camped-on frequency channel number that meets the preset condition with the second wireless communications module, so that a network search speed of the second wireless communications module can also be shortened.

In a possible embodiment, the historical frequency channel number set may be preset in the first wireless communications module, or may be a historical frequency channel number set including the first historical frequency channel number stored in the first wireless communications module and the second historical frequency channel number shared by the terminal with the first wireless communications module before the terminal controls the first wireless communications module to search the first band for the first camping frequency channel number. Similarly, the historical frequency channel number set may be preset in the second wireless communications module, or the terminal shares the first historical frequency channel number with the second wireless communications module before the terminal controls the second wireless communications module to search the second band for the second camping frequency channel number.

In a possible embodiment, a network search process of each wireless communications module in the terminal includes two phases, and a network search process of the first wireless communications module includes a first phase and a second phase. In the first phase, the terminal controls the first wireless communications module to search the frequency channel numbers included in the historical frequency channel number set for the first camping frequency channel number. If the first wireless communications module fails to search for the first camping frequency channel number in the first phase, the second phase is started, and the terminal controls the first wireless communications module to search the first band for the first camping frequency channel number. In this way, compared with a prior-art solution in which the first wireless communications module searches a full band for the first camping frequency channel number after the first wireless communications module fails to search the first historical frequency channel number for the first camping frequency channel number, in this embodiment, the first wireless communications module may find the first camping frequency channel number as early as possible in the first phase, and a time for searching for the first camping frequency channel number by the first wireless communications module in the second phase can be shortened.

Similarly, a network search process of the second wireless communications module includes a first phase and a second phase. In the first phase, the terminal controls the second wireless communications module to search the frequency channel numbers included in the historical frequency channel number set for the second camping frequency channel number. If the second wireless communications module fails to search for the second camping frequency channel number in the first phase, the second phase is started, and the terminal controls the second wireless communications module to search the second band for the second camping frequency channel number. In this way, compared with a prior-art solution in which the second wireless communications module searches a full band for the second camping frequency channel number after the second wireless communications module fails to search the second historical frequency channel number for the second camping frequency channel number, in this embodiment, the second wireless communications module may find the second camping frequency channel number as early as possible in the first phase, and a time for searching for the second camping frequency channel number by the second wireless communications module in the second phase can be shortened.

In a possible embodiment, if the first wireless communications module finds the to-be-camped-on frequency channel number that meets the preset condition, the terminal shares the to-be-camped-on frequency channel number with the second wireless communications module when determining that a network operator corresponding to the to-be-camped-on frequency channel number is the same as a network operator corresponding to the second wireless communications module. In this way, the to-be-camped-on frequency channel number may be used as a candidate frequency channel number selected by the second wireless communications module as the second camping frequency channel number, and the to-be-camped-on frequency channel number is not a frequency channel number on which the second wireless communications module cannot camp. In other words, the second wireless communications module may select to directly camp on the to-be-camped-on frequency channel number, so that a time for searching for the second camping frequency channel number by the second wireless communications module can be further shortened.

In a possible embodiment, if a network operator corresponding to the first wireless communications module is the same as a network operator corresponding to the second wireless communications module, the terminal may share the first camping frequency channel number with the second wireless communications module when the first wireless communications module finds the first camping frequency channel number, to serve as the second camping frequency channel number of the second wireless communications module. The second wireless communications module may select to camp on the first camping frequency channel number or may select not to camp on the first camping frequency channel number.

In a possible embodiment, after the terminal shares the first camping frequency channel number with the second wireless communications module, if the first camping frequency channel number meets a frequency channel number switching condition, the terminal may enable the second wireless communications module to camp on the first camping frequency channel number. The frequency channel number switching condition includes: quality of a signal received by the second wireless communications module on a frequency channel number on which the second wireless communications module currently camps is lower than quality of a signal received on the first camping frequency channel number. In this way, quality of a signal received by the second wireless communications module can be improved.

In a possible embodiment, the terminal may further include a network search control module. If the first wireless communications module finds the to-be-camped-on frequency channel number that meets the preset condition, the terminal may share the to-be-camped-on frequency channel number with the second wireless communications module by using the network search control module or the first wireless communications module.

In a possible embodiment, the first frequency channel number is a frequency division duplexing (FDD) band, and the second band is a time division duplexing (TDD) band. In this way, the terminal may search for a network on both the FDD band and the TDD band.

According to a second aspect, an embodiment provides a terminal, including a processor and a memory. The processor includes a first wireless communications module and a second wireless communications module. The memory is configured to store a program instruction and data. The processor is configured to read the program instruction in the memory, to implement the following operations: controlling the first wireless communications module to search a first band for a first camping frequency channel number, and controlling the second wireless communications module to search a second band for a second camping frequency channel number; and sharing, if the first wireless communications module finds a to-be-camped-on frequency channel number that meets a preset condition, the to-be-camped-on frequency channel number with the second wireless communications module.

In a possible embodiment, the processor is further configured to read the program instruction in the memory, to implement the following operations: controlling the first wireless communications module to search frequency channel numbers included in a historical frequency channel number set for the first camping frequency channel number, and controlling the second wireless communications module to search the frequency channel numbers included in the historical frequency channel number set for the second camping frequency channel number. The historical frequency channel number set includes a first historical frequency channel number of the first wireless communications module and a second historical frequency channel number of the second wireless communications module.

In a possible embodiment, the processor is further configured to read the program instruction in the memory, to implement the following operation: sharing the second historical frequency channel number with the first wireless communications module.

In a possible embodiment, the controlling the first wireless communications module to search a first band for a first camping frequency channel number includes: if the first wireless communications module fails to search the frequency channel numbers included in the historical frequency channel number set for the first camping frequency channel number, controlling the first wireless communications module to search the first band for the first camping frequency channel number.

In a possible embodiment, the processor is further configured to read the program instruction in the memory, to implement the following operation: sharing the first historical frequency channel number with the second wireless communications module.

In a possible embodiment, the controlling the second wireless communications module to search a second band for a second camping frequency channel number includes: if the second wireless communications module fails to search the frequency channel numbers included in the historical frequency channel number set for the second camping frequency channel number, controlling the second wireless communications module to search the second band for the second camping frequency channel number.

In a possible embodiment, if the first wireless communications module finds a to-be-camped-on frequency channel number that meets a preset condition, the sharing the to-be-camped-on frequency channel number with the second wireless communications module includes: if the first wireless communications module finds the to-be-camped-on frequency channel number that meets the preset condition, sharing the to-be-camped-on frequency channel number with the second wireless communications module when determining that a network operator corresponding to the to-be-camped-on frequency channel number is the same as a network operator corresponding to the second wireless communications module.

In a possible embodiment, if the first wireless communications module finds a to-be-camped-on frequency channel number that meets a preset condition, the sharing the to-be-camped-on frequency channel number with the second wireless communications module includes: if a network operator corresponding to the first wireless communications module is the same as a network operator corresponding to the second wireless communications module, sharing the first camping frequency channel number with the second wireless communications module when the first wireless communications module finds the first camping frequency channel number, to serve as the second camping frequency channel number of the second wireless communications module.

In a possible embodiment, the processor is further configured to read the program instruction in the memory, to implement the following operation: if the first camping frequency channel number meets a frequency channel number switching condition, switching the second wireless communications module to the first camping frequency channel number. The frequency channel number switching condition includes: quality of a signal received by the second wireless communications module on a frequency channel number on which the second wireless communications module currently camps is lower than quality of a signal received on the first camping frequency channel number.

In a possible embodiment, the processor further includes a network search control module. If the first wireless communications module finds a to-be-camped-on frequency channel number that meets a preset condition, the sharing the to-be-camped-on frequency channel number with the second wireless communications module includes: if the first wireless communications module finds the to-be-camped-on frequency channel number that meets the preset condition, sharing the to-be-camped-on frequency channel number with the second wireless communications module by using the network search control module.

Optionally, the first band and the second band each may be a long-term evolution (LTE) band or a 5G new radio (5NR) band.

In a possible embodiment, the first band is an FDD band, and the second band is a TDD band.

In a possible embodiment, the first band is a sub-6 GHz band, and the second band is a millimeter wave band.

According to a third aspect, an embodiment provides a terminal, configured to implement the method in the first aspect or any possible embodiment of the first aspect. The terminal includes corresponding function modules, which are separately configured to implement steps in the foregoing method. The functions may be implemented by hardware or may be implemented by hardware executing corresponding software. The hardware or software includes one or more modules corresponding to the foregoing functions.

In a possible embodiment, the terminal includes a first wireless communications module, a second wireless communications module, and a network search control module. The network search control module is configured to: control the first wireless communications module to search a first band for a first camping frequency channel number, and control the second wireless communications module to search a second band for a second camping frequency channel number; and if a to-be-camped-on frequency channel number that meets a preset condition and that is found by the first wireless communications module is received, share the to-be-camped-on frequency channel number with the second wireless communications module.

According to a fourth aspect, an embodiment provides a computer-readable storage medium, including a program instruction. When the program instruction is run on a computer, the computer is enabled to perform the method in the first aspect or any possible implementation of the first aspect.

According to a fifth aspect, an embodiment provides a computer program product. When the computer program product is run on a computer, the computer is enabled to perform the method in the first aspect or any possible implementation of the first aspect.

DESCRIPTION OF EMBODIMENTS

The embodiments may be applied to various mobile communications systems, for example, a new radio system, a global system for mobile communications (GSM), a code division multiple access (CDMA) system, a wideband code division multiple access (WCDMA) system, a general packet radio service (GPRS), an LTE system, a long-term evolution-advanced (LTE-A) system, an evolved long-term evolution (eLTE) system, a future 5G communications system, and another communications system. Specifically, this is not limited herein.

Figure 1:
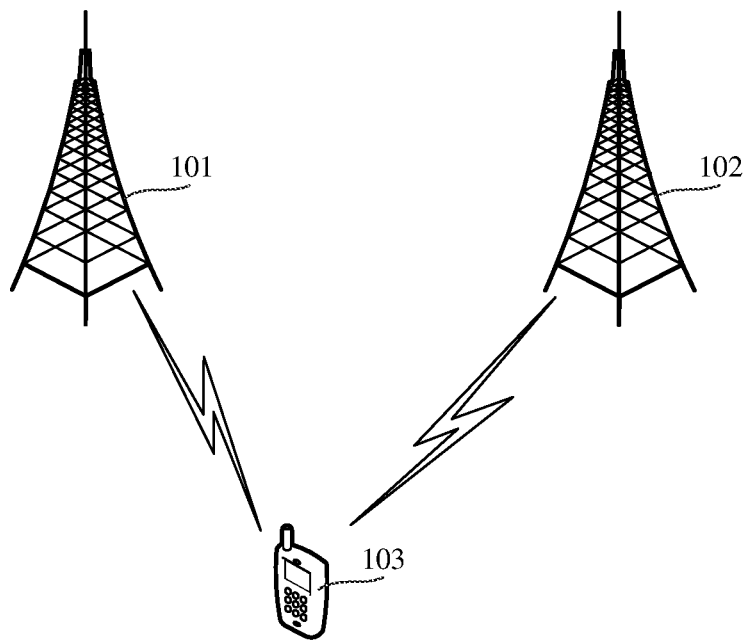
FIG. 1 is a schematic architectural diagram of a communications system to which an embodiment is applicable.

FIG. 1 is a schematic architectural diagram of an example of a communications system to which an embodiment is applicable. The communications system may include a plurality of base stations and a plurality of terminals. Each base station may support any one or more of three operator networks such as China Mobile, China Unicom, and China Telecom. The terminal supports that at least two SIM cards are on standby at the same time. The SIM card is not limited to a physical SIM card and may also be a virtual SIM card.

As shown in FIG. 1, the system architecture includes a base station 101, a base station 102, and a terminal 103. That the terminal 103 supports a SIM card 1 and a SIM card 2 is used as an example. The SIM card 1 and the SIM card 2 may belong to the same operator network, or may belong to different operator networks. Each SIM card may be attached to a cell served by a base station of an operator network to which the SIM card belongs.

For example, both the SIM card 1 and the SIM card 2 are SIM cards of China Mobile, and both the base station 101 and the base station 102 support an operator network of China Mobile. In this case, the SIM card 1 and the SIM card 2 that are included in the terminal 103 are respectively attached to a cell served by the base station 101 and a cell served by the base station 102. Alternatively, both the SIM card 1 and the SIM card 2 may be attached to a cell served by the base station 101. Alternatively, both the SIM card 1 and the SIM card 2 may be attached to a cell served by the base station 102.

For another example, both the SIM card 1 and the SIM card 2 are SIM cards of China Mobile, the base station 101 supports an operator network of China Mobile, and the base station 102 supports an operator network of China Telecom. In this case, both the SIM card 1 and the SIM card 2 may be attached to a cell served by the base station 101, but cannot be attached to a cell served by the base station 102.

For still another example, the SIM card 1 is a SIM card of China Telecom, the SIM card 2 is a SIM card of China Mobile, the base station 101 supports an operator network of China Telecom, and the base station 102 supports an operator network of China Mobile. In this case, the SIM card 1 may be attached to a cell served by the base station 101, and the SIM card 2 may be attached to a cell served by the base station 102.

Figure 2:
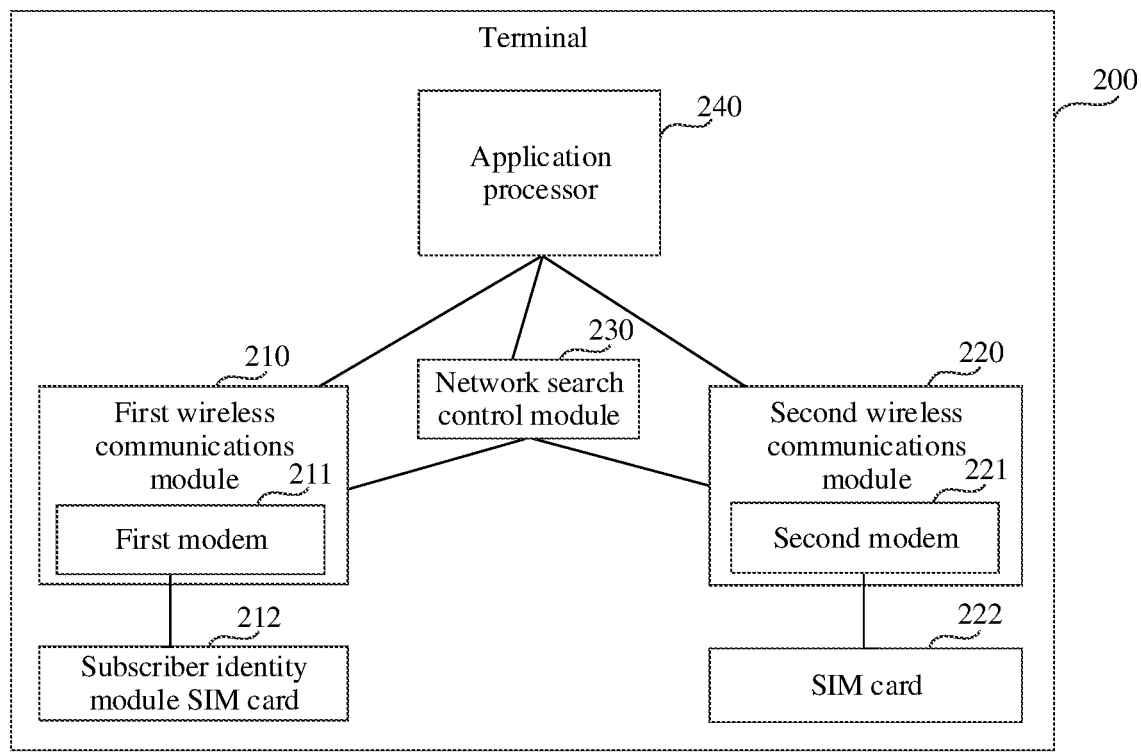
FIG. 2 is a schematic structural diagram of a terminal including a network search control module according to an embodiment.

In the embodiments, the terminal may include at least two wireless communications modules. FIG. 2 shows an example in which a terminal 200 includes two wireless communications modules: a first wireless communications module 210 and a second wireless communications module 220.

Optionally, the terminal 200 may further include a network search control module 230. The terminal 200 may control, by using the network search control module 230, the first wireless communications module 210 and the second wireless communications module 220 to perform a network search. FIG. 2 is a schematic structural diagram of an example of a terminal including a network search control module.

As shown in FIG. 2, the terminal 200 includes the first wireless communications module 210, the second wireless communications module 220, and the network search control module 230. The first wireless communications module 210 includes a first modem 211 (Modem 1) corresponding to a SIM card 212, and the second wireless communications module 220 includes a second modem 221 (Modem 2) corresponding to a SIM card 222. The SIM card 212 searches for a network and communicates with a base station by using the modem 1, and the SIM card 222 searches for a network and communicates with the base station by using the modem 2. A radio access technology supported by the modem 1 includes GSM, WCDMA, LTE, new radio, and the like, and a radio access technology supported by the modem 2 includes GSM, WCDMA, LTE, new radio, and the like.

The terminal 200 further includes an application processor 240, configured to process a network access requirement of an application program. When the SIM card 212 is used for communication, the application processor 240 sends user data to the modem 1, to further communicate with the base station by using the modem 1. When the SIM card 222 is used for communication, the application processor 240 sends user data to the modem 2, to further communicate with the base station by using the modem 2. Optionally, the application processor 240 may also send user data to the network search control module 230, and then the network search control module 230 sends the user data to the modem 1 or the modem 2.

The first wireless communications module 210 and the second wireless communications module 220 in FIG. 2 may be the same physical wireless communications module in the terminal. In this case, the SIM card 212 and the SIM card 222 that are included in the terminal share the same entity wireless communications module to communicate with the base station. Optionally, the first wireless communications module 210 and the second wireless communications module 220 may alternatively be two different entity wireless communications modules in the terminal. In this case, the SIM card 212 communicates with the base station by using the physical first wireless communications module 210 as an entity, and the SIM card 222 communicates with the base station by using the second wireless communications module 220 as an entity.

It should be understood that, in the following descriptions, terms such as "first" and "second" are merely used for distinction and description, and shall not be understood as an indication or implication of relative importance or an indication or implication of an order.

In addition, in the following descriptions, a method according to an embodiment is described by using an example in which the terminal includes any two of N wireless communications modules, where N is an integer greater than 1. The any two wireless communications modules are separately represented by a first wireless communications module and a second wireless communications module. The first wireless communications module is any one of the N wireless communications modules, and the second wireless communications module is any one of the N wireless communications modules other than the first wireless communications module. The following examples related to the first wireless communications module and the second wireless communications module are all described in detail by using an example in which the first wireless communications module is a first modem (Modem 1) and the second wireless communications module is a second modem (Modem 2) is used for detailed descriptions.

Figure 3:
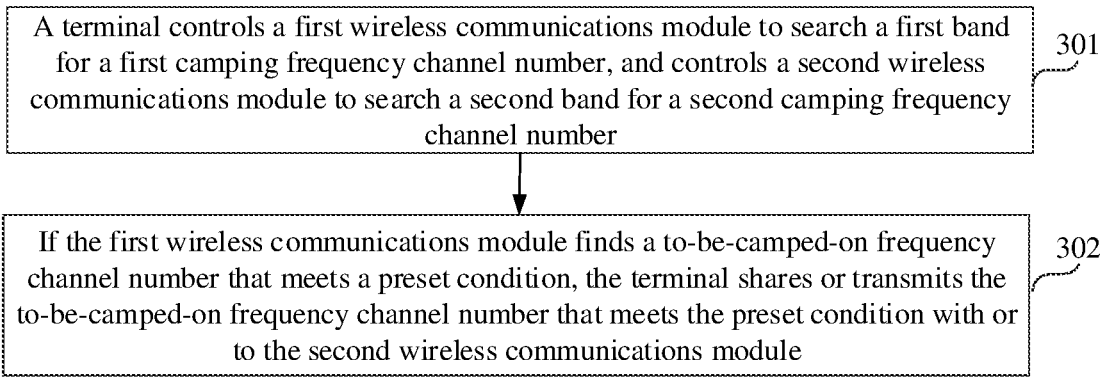
FIG. 3 is a schematic flowchart of searching for a network by a terminal according to an embodiment.

FIG. 3 shows a method for searching for a network by a terminal according to an embodiment. The method may include the following steps.

In step 301, the terminal controls a first wireless communications module to search a first band for a first camping frequency channel number, and controls a second wireless communications module to search a second band for a second camping frequency channel number.

Herein, the first band may include one band (for example, a band 39), or may include a plurality of bands (for example, a band 39 and a band 40), or may include some frequency channel numbers in one or more bands. Similarly, the second band may include one band (for example, a band 41), or may include a plurality of bands (for example, a band 2, a band 3, and a band 41), or may include some frequency channel numbers in one or more bands.

The following describes how the first wireless communications module searches for the first camping frequency channel number. That the first band includes a band 39 is used as an example. The band 39 includes 1880 MHz to 1920 MHz. For example, the band 39 may be divided into 200 wireless bands by using a frequency spacing of 200 KHz, and the 200 wireless bands are respectively numbered 1, 2, 3, 4, 5, ..., and 200. These numbers are referred to as frequency channel numbers and may be used to indicate fixed frequencies on the band 39. For example, a frequency channel number 1 on the band 39 indicates a fixed frequency of 1880 MHz, and a frequency channel number 2 on the band 39 indicates a fixed frequency of 1880.2 MHz. A camping frequency channel number in the following description indicates a cell to which a fixed frequency indicated by the camping frequency channel number belongs. Certainly, the frequency spacing may be set based on a requirement, and for example, may be 400 KHz or 1 MHz. A specific value is not limited herein.

That the first band includes the band 39 is used as an example. The first wireless communications module may search all frequency channel numbers included in the first band one by one or may search some frequency channel numbers included in the first band at intervals. If the first wireless communications module does not find the first camping frequency channel number, the first wireless communications module searches the remaining frequency channel numbers more specifically. A search target of the first wireless communications module is to search for a frequency channel number that meets a preset condition and that belongs to a network operator that is the same as a network operator corresponding to the first wireless communications module. The preset condition is that quality of a signal received on the frequency channel number meets a threshold, and the threshold may be set based on an actual requirement. This is not limited herein.

If a frequency channel number that meets the target is found, for example, a frequency channel number 2, the terminal may determine whether to camp on the frequency channel number 2. If the frequency channel number meets a camping condition, the frequency channel number 2 is the first camping frequency channel number. The camping condition is that a cell corresponding to the frequency channel number can provide a service level that meets an S criterion. For exemplary content of the S criterion, refer to the prior art. Details are not described herein.

If another frequency channel number that meets the target is further found subsequently, for example, a frequency channel number 4, a frequency channel number 10, or a frequency channel number 11, the frequency channel number 11 is the first camping frequency channel number if the terminal chooses to camp on the frequency channel number 11 instead of the frequency channel number 2.

Optionally, either of the first band and the second band may be preconfigured in a corresponding wireless communications module, or may be sent by a network search control module in the terminal to a corresponding wireless communications module when the wireless communications module has a network search requirement.

In this embodiment, that the first band and the second band have different frequency channel numbers may be implemented in the following two embodiments.

In a first exemplary embodiment, the first band and the second band have some identical frequency channel numbers. For example, the first band includes a band 39 and a band 41, and the second band includes a band 3 and the band 41. In this case, although a modem 1 and a modem 2 search for different frequency channel numbers during network searching, compared with those in an existing network search process, network search times of the modem 1 and the modem 2 can be shortened. However, a problem that the modem 1 and the modem 2 repeatedly search for a network on some frequency channel numbers (for example, a frequency channel number on the band 41) still exists. To further shorten a search time, a second embodiment may be used for implementation.

In a second embodiment, the first band and the second band have no identical frequency channel numbers. For example, the first band includes a band 39 and a band 41, and the second band includes a band 3 and a band 21. In this case, the two wireless communications modules may separately search for a network. Compared with the first embodiment, in the second embodiment modem 1 and modem 2 separately search for different frequency channel numbers. Compared with the first embodiment, the second embodiment can further reduce redundancy in a network search process, so as to waste fewer resources and shorten a network search time.

In different application scenarios, the first band and the second band may be set based on an actual requirement. For example, a union of the first band and the second band is a full band. In another example, a union of the first band and the second band is only a part of a full band. For example, the first band is an FDD band such as an FDD-LTE band of 2145 MHz to 2170 MHz of China Unicom or an FDD-LTE band of 1755 MHz to 1785 MHz of China Telecom, and the second band is a TDD band such as a TDD-LTE band of 2370 MHz to 2390 MHz of China Telecom or a TDD-LTE band of 1220 MHz to 2370 MHz of China Mobile. Optionally, the first band and the second band each may be an LTE band, or may be a band of a next-generation communications system. For example, for a frequency range 1 and a frequency range 2 in a protocol of Release-15, the first band may be in the frequency range 1, which represents a cellular band with a frequency range of 450 MHz to 6000 MHz, and is also referred to as a sub-6 GHz band. The second band may be in the frequency range 2, which represents a frequency range of 24.25 GHz to 52.6 GHz, and is also referred to as a millimeter wave band.

This embodiment is applicable to a plurality of scenarios. For example, in a scenario in which the terminal is powered on for the first time to search for a network, the terminal has no historical frequency channel number, and needs to search a full band for a camping frequency channel number. In this embodiment, the full band is all bands supported by the terminal. For example, if network standards supported by the terminal include 2G, 3G, and 4G, the full band includes all frequency channel numbers allocated by a system to a 2G network, a 3G network, and a 4G network. Therefore, the full band may be divided into two parts: the first band and the second band. The modem 1 searches the first band for the first camping frequency channel number, and the modem 2 searches the second band for the second camping frequency channel number, so that the two modems separately search for a network, thereby shortening a network search time.

For another example, in a scenario in which the terminal searches for a network on a high-speed train, the terminal changes a network environment in a short time with movement of the high-speed train. In this case, the terminal needs to very quickly find a camping frequency channel number, and a camping frequency channel number switching speed also needs to be very fast, so as to ensure that network disconnection does not occur on a user. Therefore, railway dedicated frequency channel numbers of cells along a high-speed railway may be preset in the terminal. When the terminal arrives at each cell along the high-speed railway, the terminal preferentially searches for railway dedicated frequency channel numbers of the cell along the high-speed railway. The railway dedicated frequency channel numbers may be divided into two parts: Some railway dedicated frequency channel numbers are searched for by the modem 1, and the other railway dedicated frequency channel numbers are searched for by the modem 2. If the modem 1 finds a to-be-camped-on frequency channel number that meets a preset condition, the modem 1 shares the to-be-camped-on frequency channel number with the modem 2. If the modem 2 finds a to-be-camped-on frequency channel number that meets a preset condition, the modem 2 shares the to-be-camped-on frequency channel number with the modem 1. In this way, the modem 1 and the modem 2 separately search for a network in a cooperative manner, so as to shorten a network search time of the terminal.

In step 302, if the first wireless communications module finds a to-be-camped-on frequency channel number that meets a preset condition, the terminal shares the to-be-camped-on frequency channel number that meets the preset condition with the second wireless communications module.

The to-be-camped-on frequency channel number that meets the preset condition may be used as a frequency channel number on which the second wireless communications module subsequently camps on a cell or accesses a network.

For example, that the first wireless communications module is a modem 1 is used as an example. The modem 1 correspondingly supports a network search of a SIM card 1, and a network operator supported by the SIM card 1 corresponding to the modem 1 is China Mobile. The modem 1 finds a frequency channel number G that meets a preset condition, for example, a frequency indicated by the frequency channel number G is 1900 MHz, and the frequency channel number G meets a camping condition. A public land mobile network (PLMN) corresponding to the frequency channel number G is 46000. For example, a mobile country code is 460, which indicates China, and a mobile network code (MNC) is 00, which indicates "Mobile". A network operator of the frequency channel number G is the same as the network operator of the SIM card 1. In this case, the frequency channel number G may be used as the first camping frequency channel number of the modem 1.

In the foregoing solution provided in this embodiment, the terminal controls the first wireless communications module to search the first band for the first camping frequency channel number, and controls the second wireless communications module to search the second band for the second camping frequency channel number. Therefore, compared with the prior art in which both the first wireless communications module and the second wireless communications module search a full band for a camping frequency channel number, the solution provided in this embodiment can accelerate a network search process of the terminal.

Further, if the first wireless communications module finds the to-be-camped-on frequency channel number that meets the preset condition, the terminal shares, with the second wireless communications module, the to-be-camped-on frequency channel number that meets the preset condition and that is found by the first wireless communications module. In this way, a network search time of the second wireless communications module can be shortened.

Correspondingly, if the second wireless communications module finds a to-be-camped-on frequency channel number that meets a preset condition, the terminal shares the to-be-camped-on frequency channel number found by the second wireless communications module with the first wireless communications module. In this way, a network search time of the first wireless communications module can be shortened. In addition, in a network search process of the terminal, the first wireless communications module may obtain the to-be-camped-on frequency channel number that meets the preset condition and that is found by the second wireless communications module and the second wireless communications module may obtain the to-be-camped-on frequency channel number that meets the preset condition and that is found by the first wireless communications module. For example, when a network search speed of one of the first wireless communications module and the second wireless communications module is relatively low, the one with a relatively low network search speed may obtain, in advance, a to-be-camped-on frequency channel number that meets a preset condition.

In an optional implementation, the method performed by the terminal in FIG. 3 may be performed by the network search control module 230 in the terminal 200 in FIG. 2. The method performed by the network search control module 230 may be implemented by a software program. For example, the network search control module controls a first wireless communications module to search a first band for a first camping frequency channel number, and controls a second wireless communications module to search a second band for a second camping frequency channel number. If any wireless communications module finds a to-be-camped-on frequency channel number that meets a preset condition, for example, the first wireless communications module finds a to-be-camped-on frequency channel number, in an implementation, the first wireless communications module sends the to-be-camped-on frequency channel number that meets the preset condition to the network search control module, and the network search control module sends the to-be-camped-on frequency channel number that meets the preset condition to the second wireless communications module. In another implementation, the first wireless communications module sends the to-be-camped-on frequency channel number that meets the preset condition to the second wireless communications module. During an exemplary implementation, an information sharing channel may be established between the first wireless communications module and the second wireless communications module, so that the two wireless communications modules share found to-be-camped-on frequency channel numbers.

During an exemplary implementation of step 301, the first wireless communications module and the second wireless communications module may search for respective camping frequency channel numbers synchronously or may search for respective camping frequency channel numbers asynchronously. To enable the two wireless communications modules to find respective camping frequency channel numbers more quickly, the two wireless communications modules are enabled as much as possible to search for respective camping frequency channel numbers synchronously, so that a network search time of a wireless communications module with a relatively low network search speed can be shortened.

In this embodiment, the terminal may control the first wireless communications module to search the first band for the first camping frequency channel number, and control the second wireless communications module to search the second band for the second camping frequency channel number in step 301, in the following several optional implementations such as an embodiment a1, an embodiment a2, and an embodiment a3:

In embodiment a1, when the terminal does not include a historical frequency channel number of each wireless communications module, for example, when the terminal is powered on for the first time to search for a network, or when the terminal roams to a specific location for the first time in a scenario in which the terminal roams, the terminal controls the first wireless communications module to search the first band for the first camping frequency channel number, and controls the second wireless communications module to search the second band for the second camping frequency channel number.

In embodiment a2, when the terminal includes historical frequency channel numbers of each wireless communications module, for example, the terminal roams to a specific location for the $M^{th}$ time in a scenario in which the terminal searches for a network during roaming, where M is an integer greater than 1, after each wireless communications module fails to search the historical frequency channel numbers of the wireless communications module for a camping frequency channel number, the first wireless communications module searches the first band for the first camping frequency channel number, and the second wireless communications module searches the second band for the second camping frequency channel number.

In an example, the modem 1 searches historical frequency channel numbers of the modem 1 for the first camping frequency channel number. If the modem 1 finds a to-be-camped-on frequency channel number that meets a preset condition, for example, a frequency indicated by a frequency channel number G is 1900, the modem 1 sends the frequency channel number G to the modem 2. In addition, the modem 1 determines whether a network operator corresponding to the frequency channel number G is the same as a network operator corresponding to the modem 1. If the network operator corresponding to the frequency channel number G is the same as the network operator corresponding to the modem 1, the modem 1 camps on a cell to which the frequency 1900 belongs, in other words, the frequency channel number G may be used as the first camping frequency channel number of the modem 1. If the network operator corresponding to the frequency channel number G is different from the network operator corresponding to the modem 1, the modem 1 continues to search for the first camping frequency channel number. If the modem 1 does not find the first camping frequency channel number from the historical frequency channel numbers of the modem 1, the modem 1 searches the first band for the first camping frequency channel number. Similarly, if the modem 2 does not find the second camping frequency channel number from historical frequency channel numbers of the modem 2, the modem 2 searches the second band for the second camping frequency channel number.

In embodiment a3, when the terminal includes historical frequency channel numbers of each wireless communications module, the terminal first searches frequency channel numbers included in a historical frequency channel number set for a network. The historical frequency channel number set includes a first historical frequency channel number and a second historical frequency channel number. The first historical frequency channel number is a frequency channel number that meets a camping condition and that is historically found by the first wireless communications module, and the second historical frequency channel number is a frequency channel number that meets a camping condition and that is historically found by the second wireless communications module. In an optional manner, the terminal shares the first historical frequency channel number of the first wireless communications module with the second wireless communications module, to control the second wireless communications module to search the first historical frequency channel number and the second historical frequency channel number for the second camping frequency channel number. Because the user is usually in a fixed place, the terminal carried by the user also has a frequency channel number on which the terminal usually camps, so that the second wireless communications module can find the second camping frequency channel number more quickly from the first historical frequency channel number and the second historical frequency channel number. Similarly, the terminal shares the second historical frequency channel number of the second wireless communications module with the first wireless communications module, to control the first wireless communications module to search the first historical frequency channel number and the second historical frequency channel number for the first camping frequency channel number, so that the first wireless communications module can find the first camping frequency channel number more quickly.

The historical frequency channel number set may be preset in the first wireless communications module. Alternatively, before the terminal controls the first wireless communications module to search the first band for the first camping frequency channel number, the terminal shares the second historical frequency channel number with the first wireless communications module, so that the first wireless communications module assembles the obtained second historical frequency channel number and the first historical frequency channel number stored in the first wireless communications module into a historical frequency channel number set. Similarly, the historical frequency channel number set may be preset in the second wireless communications module. Alternatively, before the terminal controls the second wireless communications module to search the second band for the second camping frequency channel number, the terminal shares the first historical frequency channel number with the second wireless communications module, so that the second wireless communications module assembles the obtained first historical frequency channel number and the second historical frequency channel number stored in the second wireless communications module into a historical frequency channel number set.

A network search process of each wireless communications module in the terminal includes two phases, and a network search process of the first wireless communications module includes a first phase and a second phase. In the first phase, the terminal controls the first wireless communications module to search the frequency channel numbers included in the historical frequency channel number set for the first camping frequency channel number. If the terminal fails to control the first wireless communications module to search the frequency channel numbers included in the historical frequency channel number set for the first camping frequency channel number in the first phase, the second phase is started, and the terminal controls the first wireless communications module to search the first band for the first camping frequency channel number. In this way, compared with a prior-art solution in which the first wireless communications module searches a full band for the first camping frequency channel number after the first wireless communications module fails to search the first historical frequency channel number for the first camping frequency channel number, in this embodiment, the first wireless communications module may find the first camping frequency channel number as early as possible in the first phase, and a time for searching for the first camping frequency channel number by the first wireless communications module in the second phase can be shortened.

Optionally, frequency channel numbers included in the first band may include the frequency channel numbers in the historical frequency channel number set, or may not include the frequency channel numbers in the historical frequency channel number set. To prevent the first wireless communications module from repeatedly searching frequency channel numbers in the second phase that have been searched in the first phase, before the first wireless communications module enters the second phase to perform a search, frequency channel numbers that are included in the first band and belong to the historical frequency channel number set may be removed.

Similarly, a network search process of the second wireless communications module includes a first phase and a second phase. In the first phase, the terminal controls the second wireless communications module to search the frequency channel numbers included in the historical frequency channel number set for the second camping frequency channel number. If the terminal fails to control the second wireless communications module to search the frequency channel numbers included in the historical frequency channel number set for the second camping frequency channel number in the first phase, the second phase is started, and the terminal controls the second wireless communications module to search the second band for the second camping frequency channel number. In this way, compared with a prior-art solution in which the second wireless communications module searches a full band for the second camping frequency channel number after the second wireless communications module fails to search the second historical frequency channel number for the second camping frequency channel number, in this embodiment, the second wireless communications module may find the second camping frequency channel number as early as possible in the first phase, and a time for searching for the second camping frequency channel number by the second wireless communications module in the second phase can be shortened.

That the modem 1 searches for a camping frequency channel number is used as an example. The modem 1 first searches the frequency channel numbers included in the historical frequency channel number set for the first camping frequency channel number, and if the modem 1 finds a to-be-camped-on frequency channel number that meets a preset condition from the frequency channel numbers included in the historical frequency channel number set, the modem 1 determines, based on a PLMN of the found to-be-camped-on frequency channel number, whether the to-be-camped-on frequency channel number that meets the preset condition may be used as the first camping frequency channel number of the modem 1. In this example, for an exemplary manner of determining, based on the PLMN of the to-be-camped-on frequency channel number, whether the to-be-camped-on frequency channel number is the first camping frequency channel number of the modem 1, refer to the example in the exemplary embodiment a2. Details are not described herein again. If the modem 1 fails to search the frequency channel numbers included in the historical frequency channel number set for the camping frequency channel number, the modem 1 searches the first band for the first camping frequency channel number.

In the solution in this example, either of the modem 1 and the modem 2 searches for a network based on both a historical frequency channel number of the modem 1 or the modem 2 and a historical frequency channel number of another modem. Compared with the prior art in which the modem 1 searches for a network based only on a historical frequency channel number of the modem 1 and the modem 2 also searches for a network based only on a historical frequency channel number of the modem 2, in this embodiment, each modem may search for a camping frequency channel number based on more pieces of known frequency channel number information. In this way, each modem is more likely to find a camping frequency channel number of the modem in advance. For example, the modem 1 may find the first camping frequency channel number in advance, and the modem 2 may find the second camping frequency channel number in advance. In this way, a network search speed of the terminal can be accelerated.

In this embodiment, each modem sequentially searches frequency channel numbers one by one for a camping frequency channel number of the modem in a network search period. That the modem 1 searches the first band for the first camping frequency channel number in a current period is used as an example. The modem 1 determines whether the first frequency channel number L on the first band meets a preset condition, and if the frequency channel number L meets the preset condition, shares the frequency channel number L with the modem 2. In addition, the modem 1 determines whether a network operator corresponding to the frequency channel number L is the same as a network operator corresponding to the modem 1. If the network operator corresponding to the frequency channel number L is the same as the network operator corresponding to the modem 1, and the frequency channel number L meets a camping condition, the modem 1 camps on the frequency channel number L. If the network operator corresponding to the frequency channel number L is different from the network operator corresponding to the modem 1, or the frequency channel number L does not meet the camping condition, the modem 1 continues to search frequency channel numbers on the first band other than the frequency channel number L for the first camping frequency channel number. In addition, even if the modem 1 camps on the frequency channel number L, the modem 1 still continues to search the other frequency channel numbers on the first band other than the frequency channel number L for the first camping frequency channel number, so that when the first camping frequency channel number on which a signal of higher quality can be received is found, the modem 1 camps on the first camping frequency channel number on which a signal of higher quality can be received. If the modem 1 fails to search the first band for the first camping frequency channel number in the current network search period, in other words, the modem 1 does not find the first camping frequency channel number from the first band in the current network search period, the modem 1 continues to search the first band for the first camping frequency channel number in a next network search period of the current network search period.

In step 302, an example in which the first wireless communications module finds the to-be-camped-on frequency channel number that meets the preset condition, and the terminal shares the to-be-camped-on frequency channel number that meets the preset condition with the second wireless communications module is used to describe several exemplary subsequent operation manners that may be performed by the second wireless communications module to obtain the to-be-camped-on frequency channel number that meets the preset condition.

In embodiment b1, if a network operator corresponding to the to-be-camped-on frequency channel number that meets the preset condition is different from a network operator corresponding to the second wireless communications module, the second wireless communications module cannot camp on the to-be-camped-on frequency channel number that meets the preset condition, and the second wireless communications module continues to search for the second camping frequency channel number.

In embodiment b2, if a network operator corresponding to the to-be-camped-on frequency channel number that meets the preset condition is the same as a network operator corresponding to the second wireless communications module, the to-be-camped-on frequency channel number meets a camping condition, and the second wireless communications module does not camp on any frequency channel number, the second wireless communications module may directly camp on the to-be-camped-on frequency channel number that meets the preset condition.

In embodiment b3, if a network operator corresponding to the to-be-camped-on frequency channel number that meets the preset condition is the same as a network operator corresponding to the second wireless communications module, and the to-be-camped-on frequency channel number meets a camping condition, but the second wireless communications module has camped on a specific frequency channel number before receiving the to-be-camped-on frequency channel number that meets the preset condition, the second wireless communications module may determine whether a camping frequency channel number needs to be switched.

In an example, it may be determined, based on whether the to-be-camped-on frequency channel number that meets the preset condition meets a frequency channel number switching condition, whether the second wireless communications module is switched to the to-be-camped-on frequency channel number. The frequency channel number switching condition includes: The to-be-camped-on frequency channel number that meets the preset condition meets a camping condition, and quality of a signal received by the second wireless communications module on a frequency channel number on which the second wireless communications module currently camps is lower than quality of a signal received on the to-be-camped-on frequency channel number. For example, if the to-be-camped-on frequency channel number that meets the preset condition does not meet the frequency channel number switching condition, the second wireless communications module does not switch a camping frequency channel number, but still camps on a frequency channel number on which the second wireless communications module has camped, so that the second wireless communications module camps on the frequency channel number on which the second wireless communications module has camped and on which a signal of higher quality can be received. If the to-be-camped-on frequency channel number that meets the preset condition meets the frequency channel number switching condition, the second wireless communications module is switched to the to-be-camped-on frequency channel number that meets the preset condition, so that the second wireless communications module camps on the to-be-camped-on frequency channel number on which a signal of higher quality can be received.

In the embodiment b1, the embodiment b2, and the embodiment b3, the second wireless communications module may determine whether the network operator corresponding to the to-be-camped-on frequency channel number that meets the preset condition and that is obtained by the second wireless communications module is the same as the network operator corresponding to the second wireless communications module. For example, when the first wireless communications module finds the to-be-camped-on frequency channel number that meets the preset condition, regardless of whether the to-be-camped-on frequency channel number that meets the preset condition may be used as the second camping frequency channel number, the terminal shares the to-be-camped-on frequency channel number with the second wireless communications module. In this way, as long as the first wireless communications module finds the to-be-camped-on frequency channel number that meets the preset condition, the to-be-camped-on frequency channel number is shared with the second wireless communications module, and many to-be-camped-on frequency channel numbers that cannot be camped on may be shared with the second wireless communications module. Consequently, a resource waste is caused.

To further reduce a quantity of interaction instances in the terminal, the network search control module may also determine whether the network operator corresponding to the to-be-camped-on frequency channel number that meets the preset condition is the same as the network operator corresponding to the second wireless communications module. If the network operator corresponding to the to-be-camped-on frequency channel number that meets the preset condition is the same as the network operator corresponding to the second wireless communications module, the network search control module shares the to-be-camped-on frequency channel number that meets the preset condition with the second wireless communications module, so that the second wireless communications module camps on the to-be-camped-on frequency channel number that meets the preset condition. If the network operator corresponding to the to-be-camped-on frequency channel number that meets the preset condition is different from the network operator corresponding to the second wireless communications module, the network search control module adds the to-be-camped-on frequency channel number that meets the preset condition to the historical frequency channel number set. In this way, a to-be-camped-on frequency channel number that cannot be used as the second camping frequency channel number can be prevented from being shared with the second wireless communications module, so that a quantity of instances of interactions between the modules in the terminal can be reduced, and power consumption can be reduced.

In this embodiment, the network operator corresponding to the first wireless communications module and the network operator corresponding to the second wireless communications module may be the same network operator, or may be different network operators. If the network operator corresponding to the first wireless communications module is the same as the network operator corresponding to the second wireless communications module, when the first wireless communications module finds the first camping frequency channel number, the terminal shares the first camping frequency channel number with the second wireless communications module, so that the second wireless communications module directly camps on the first camping frequency channel number. If the network operator corresponding to the first wireless communications module is different from the network operator corresponding to the second wireless communications module, when the first wireless communications module finds the first camping frequency channel number, the second wireless communications module cannot camp on the first camping frequency channel number.

Figure 4A:
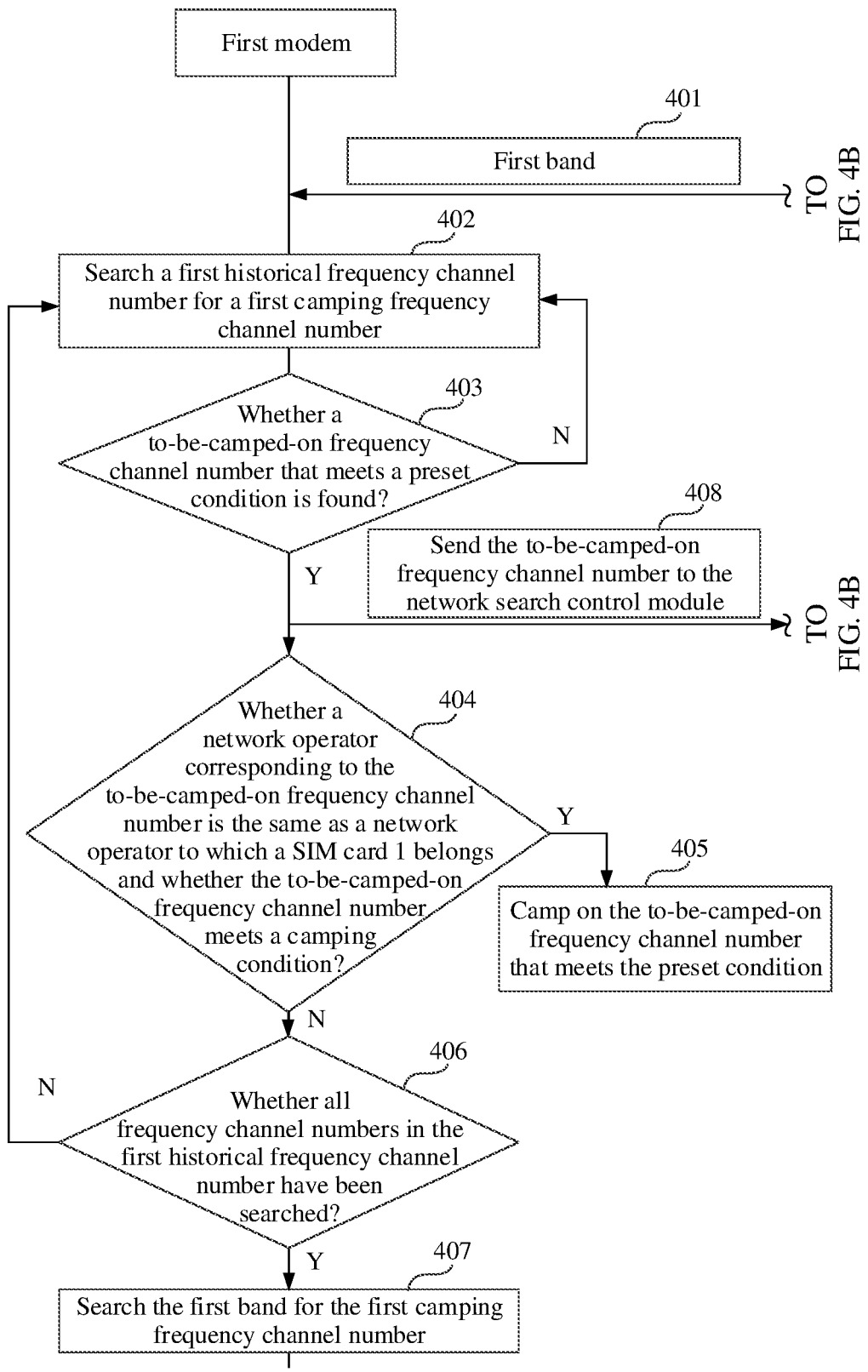
FIG. 4A is another schematic flowchart of searching for a network by a terminal according to an embodiment.
Figure 4B:
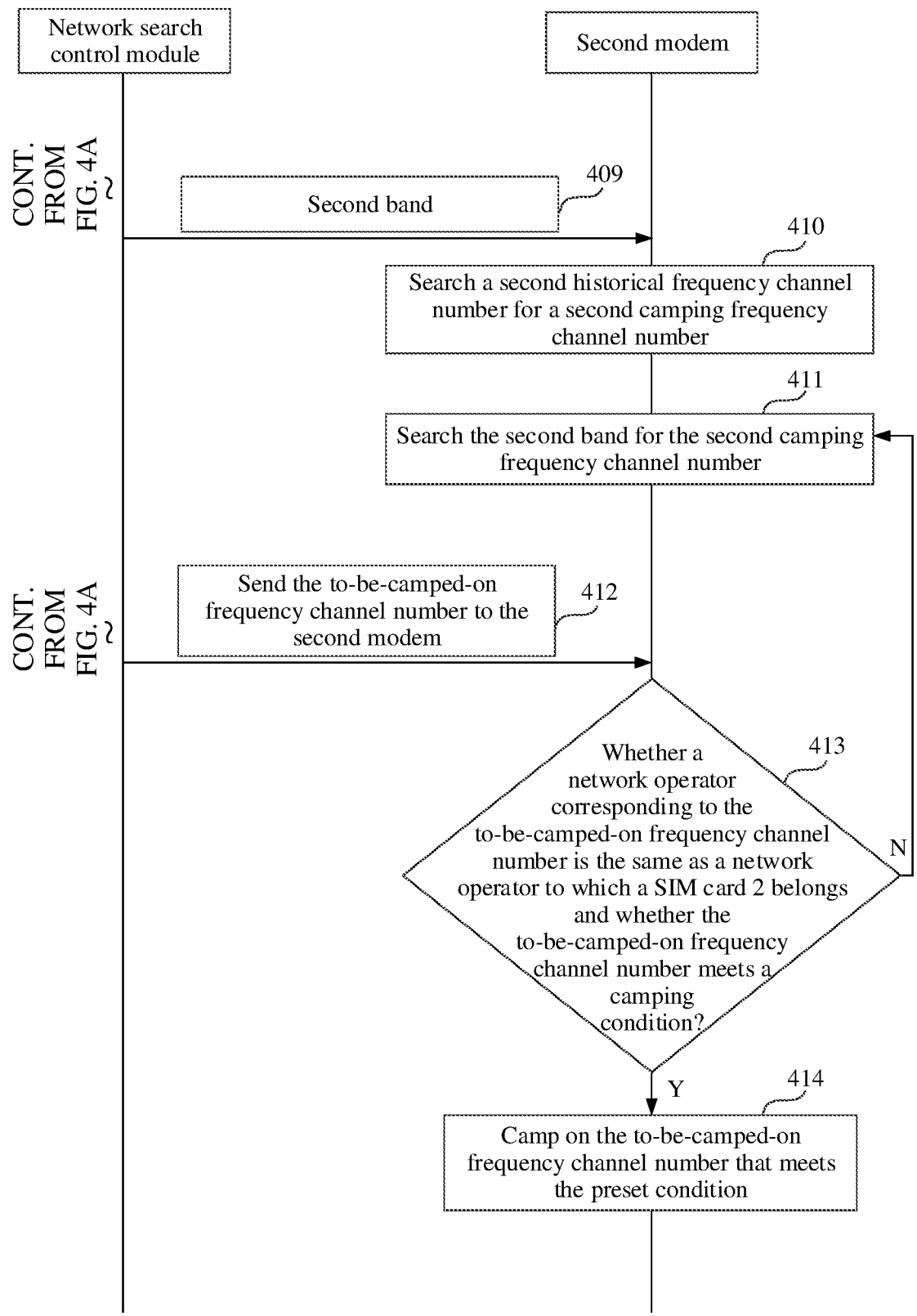
FIG. 4B is another schematic flowchart of searching for a network by a terminal according to an embodiment.

Based on the foregoing embodiment, that a method for searching for a network by a terminal is performed by the network search control module in the terminal 200 is used as an example. FIG. 4A and FIG. 4B show another method for searching for a network by a terminal according to an embodiment. The method may include the following steps.

In step 401, the network search control module sends a first band to a first modem.

In step 402, the first modem searches a first historical frequency channel number for a first camping frequency channel number, where the first historical frequency channel number is a frequency channel number that meets a camping condition and that is historically found by the first modem.

In step 403, the first modem determines whether a to-be-camped-on frequency channel number that meets a preset condition is found; and if the to-be-camped-on frequency channel number that meets the preset condition is found, the first modem performs step 404 and step 408; or if the to-be-camped-on frequency channel number that meets the preset condition is not found, the first modem performs step 402.

Before step 403, the method further includes: The first modem obtains a system message, parses the system message to obtain a PLMN corresponding to the to-be-camped-on frequency channel number, and performs step 404 based on the PLMN corresponding to the to-be-camped-on frequency channel number. For example, for how to determine, based on the PLMN, whether a network operator corresponding to the to-be-camped-on frequency channel number is the same as a network operator to which a SIM card 1 belongs, refer to the example in the embodiment shown in FIG. 3. Details are not described herein again.

In step 404, the first modem determines whether a network operator corresponding to the to-be-camped-on frequency channel number that meets the preset condition is the same as a network operator to which a SIM card 1 belongs, and whether the to-be-camped-on frequency channel number meets a camping condition; and if the network operator corresponding to the to-be-camped-on frequency channel number that meets the preset condition is the same as the network operator to which the SIM card 1 belongs, and the to-be-camped-on frequency channel number meets the camping condition, the first modem performs step 405; or if the network operator corresponding to the to-be-camped-on frequency channel number that meets the preset condition is different from the network operator to which the SIM card 1 belongs, and the to-be-camped-on frequency channel number does not meet the camping condition, the first modem performs step 406.

In step 405, the first modem camps on the to-be-camped-on frequency channel number that meets the preset condition, in other words, the to-be-camped-on frequency channel number that meets the preset condition is the first camping frequency channel number.

In step 406, whether the first modem has searched all frequency channel numbers in the first historical frequency channel number is determined; and if the first modem has searched all the frequency channel numbers in the first historical frequency channel number, step 407 is performed; or if the first modem has not searched all the frequency channel numbers in the first historical frequency channel number, step 402 is performed.

In step 402, the first modem searches each of a plurality of frequency channel numbers included in the first historical frequency channel number for the first camping frequency channel number. For example, it is assumed that the first historical frequency channel number includes a frequency channel number A, a frequency channel number B, and a frequency channel number C. For the frequency channel number A, step 403 to step 406 are performed. Then, for each of the frequency channel number B and the frequency channel number C, the first modem performs step 403 to step 406. Next, the first modem performs step 407.

In step 407, the first modem searches the first band for the first camping frequency channel number. After step 407, the first modem may further perform step 403 to step 406. Details are not described again.

In step 408, the first modem sends the to-be-camped-on frequency channel number that meets the preset condition to the network search control module.

It should be noted that there is no sequence of performing step 404 and step 408. The example shown in FIG. 4A and FIG. 4B further includes the following steps 409 to 411. There is no sequence of performing any one of steps 409 to 411 and any one of steps 412 to 414.

In step 409, the network search control module sends a second band to a second modem.

In step 410, the second modem searches a second historical frequency channel number for a second camping frequency channel number, where the second historical frequency channel number is a frequency channel number that meets a preset condition and that is historically found by the second modem. After step 410, some steps performed by the second modem are omitted. The omitted steps are similar to steps 403 to 406 and step 408 performed by the first modem. Details are not described herein again. When the second modem fails to search the second historical frequency channel number for the camping frequency channel number, step 411 is performed.

In step 411, the second modem searches the second band for the second camping frequency channel number. After step 411, the second modem may further perform an action similar to that performed by the first modem in steps 403 to 406. Details are not described herein again.

After step 408, the second modem performs steps 412 to 414.

In step 412, the network search control module sends the to-be-camped-on frequency channel number that meets the preset condition to the second modem.

In step 413, the second modem determines whether the network operator corresponding to the to-be-camped-on frequency channel number that meets the preset condition is the same as a network operator to which a SIM card 2 belongs, and whether the to-be-camped-on frequency channel number meets the camping condition; and if the network operator corresponding to the to-be-camped-on frequency channel number that meets the preset condition is the same as the network operator to which the SIM card 2 belongs, and the to-be-camped-on frequency channel number meets the camping condition, the second modem performs step 414; or if the network operator corresponding to the to-be-camped-on frequency channel number that meets the preset condition is different from the network operator to which the SIM card 2 belongs, and the to-be-camped-on frequency channel number does not meet the camping condition, the second modem performs step 410 or step 411, or ends network searching.

In step 414, the second modem camps on the to-be-camped-on frequency channel number that meets the preset condition, where the to-be-camped-on frequency channel number that meets the preset condition is the second camping frequency channel number.

It should be noted that there is no sequence of performing any one of steps 404 to 407 and any one of steps 412 to 414.

In this embodiment, exemplary manners of searching for a camping frequency channel number by the first modem and the second modem are described. In an optional manner, as shown in FIG. 4A and FIG. 4B, the first modem may first search the first historical frequency channel number for the first camping frequency channel number, and then search the first band for the first camping frequency channel number; and the second modem may first search the second historical frequency channel number for the second camping frequency channel number, and then search the second band for the second camping frequency channel number. In another optional manner, the first modem may alternatively first search the first historical frequency channel number and the second historical frequency channel number for the first camping frequency channel number, and then search the first band for the first camping frequency channel number in step 402; and the second modem may alternatively first search the first historical frequency channel number and the second historical frequency channel number for the second camping frequency channel number, and then search the second band for the second camping frequency channel number in step 410. In still another optional manner, as shown in FIG. 5 and FIG. 6A and FIG. 6B, the first modem first searches the first historical frequency channel number and the second historical frequency channel number for the first camping frequency channel number, and then searches a full band for the first camping frequency channel number; and the second modem first searches the first historical frequency channel number and the second historical frequency channel number for the second camping frequency channel number, and then searches the full band for the second camping frequency channel number.

Figure 5:
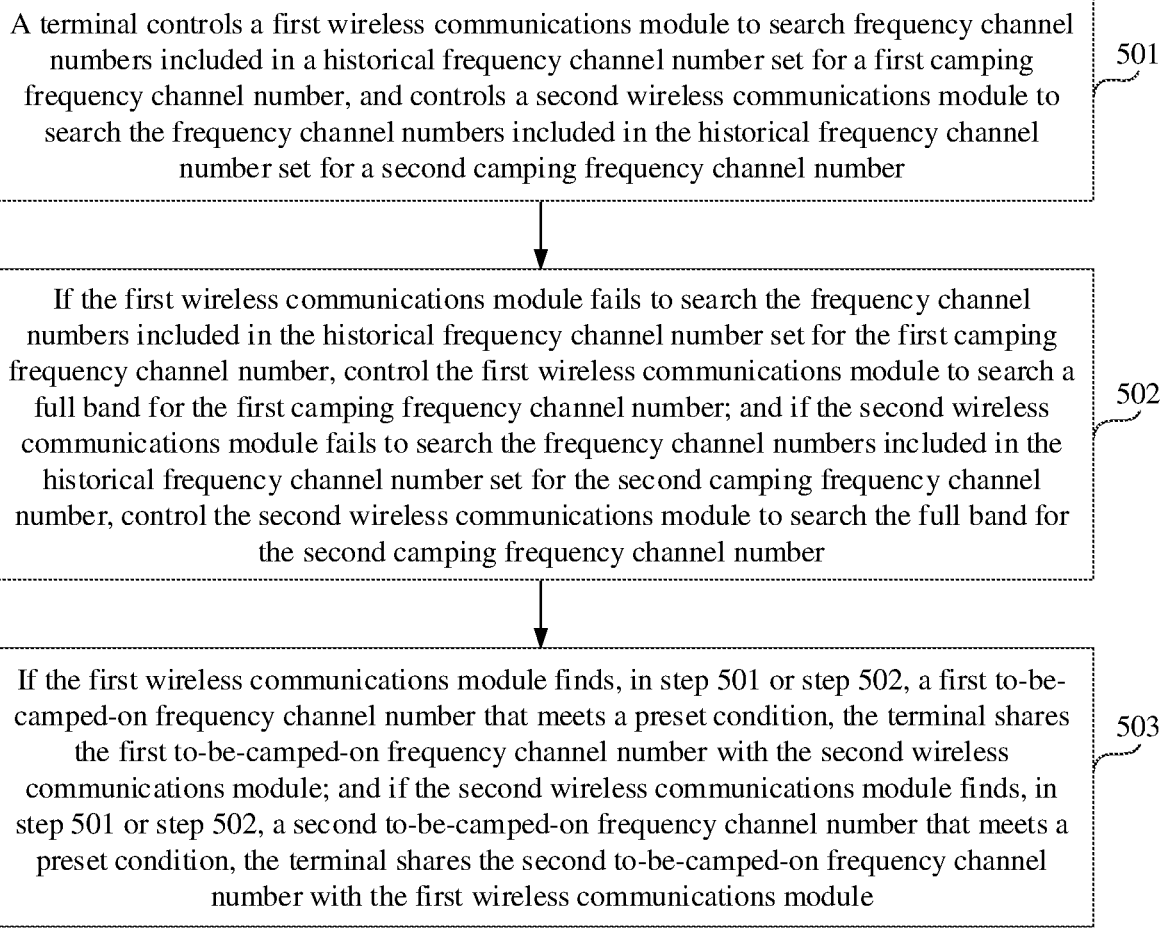
FIG. 5 is another schematic flowchart of searching for a network by a terminal according to an embodiment.
Figure 6A:
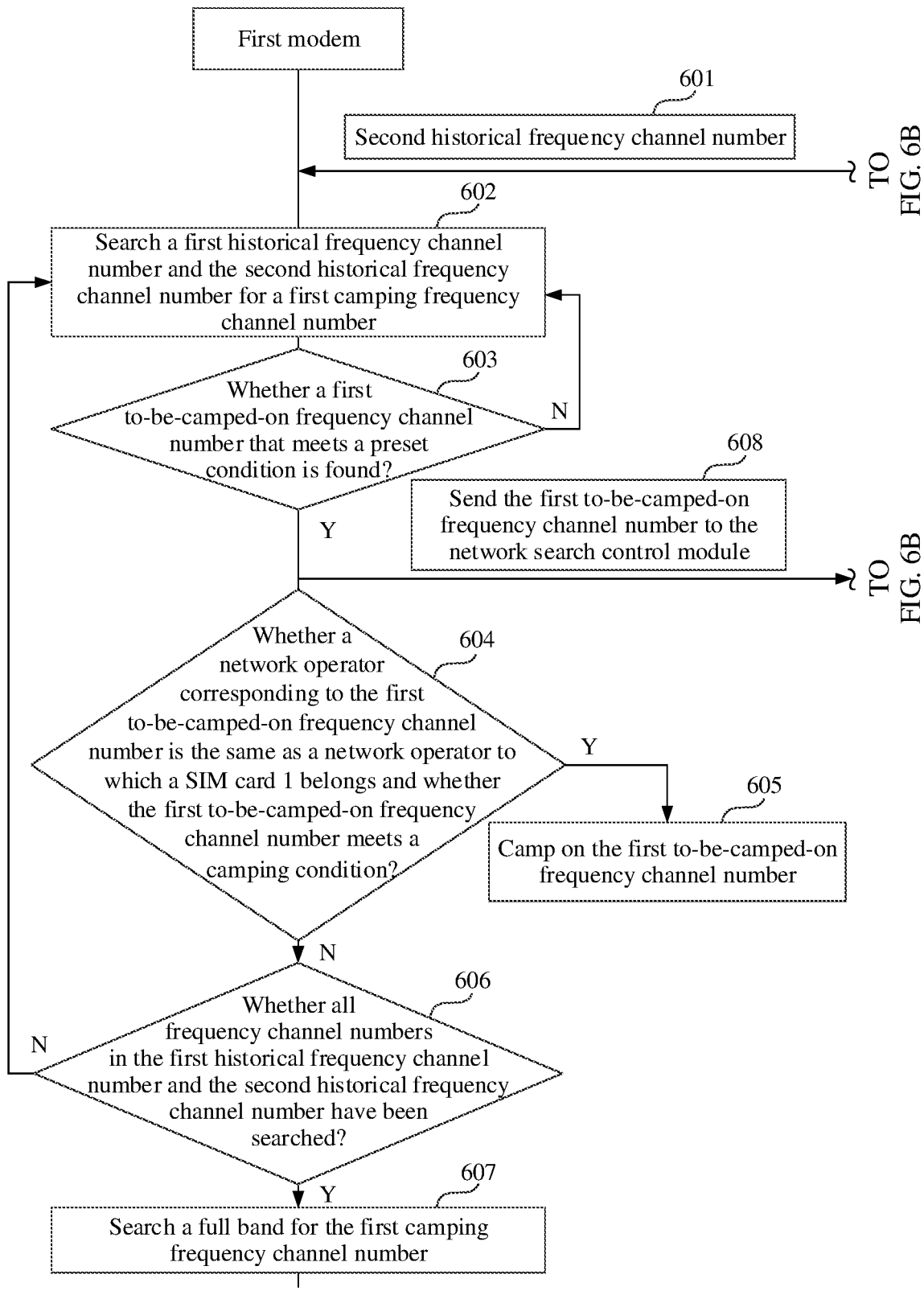
FIG. 6A is another schematic flowchart of searching for a network by a terminal according to an embodiment.
Figure 6B:
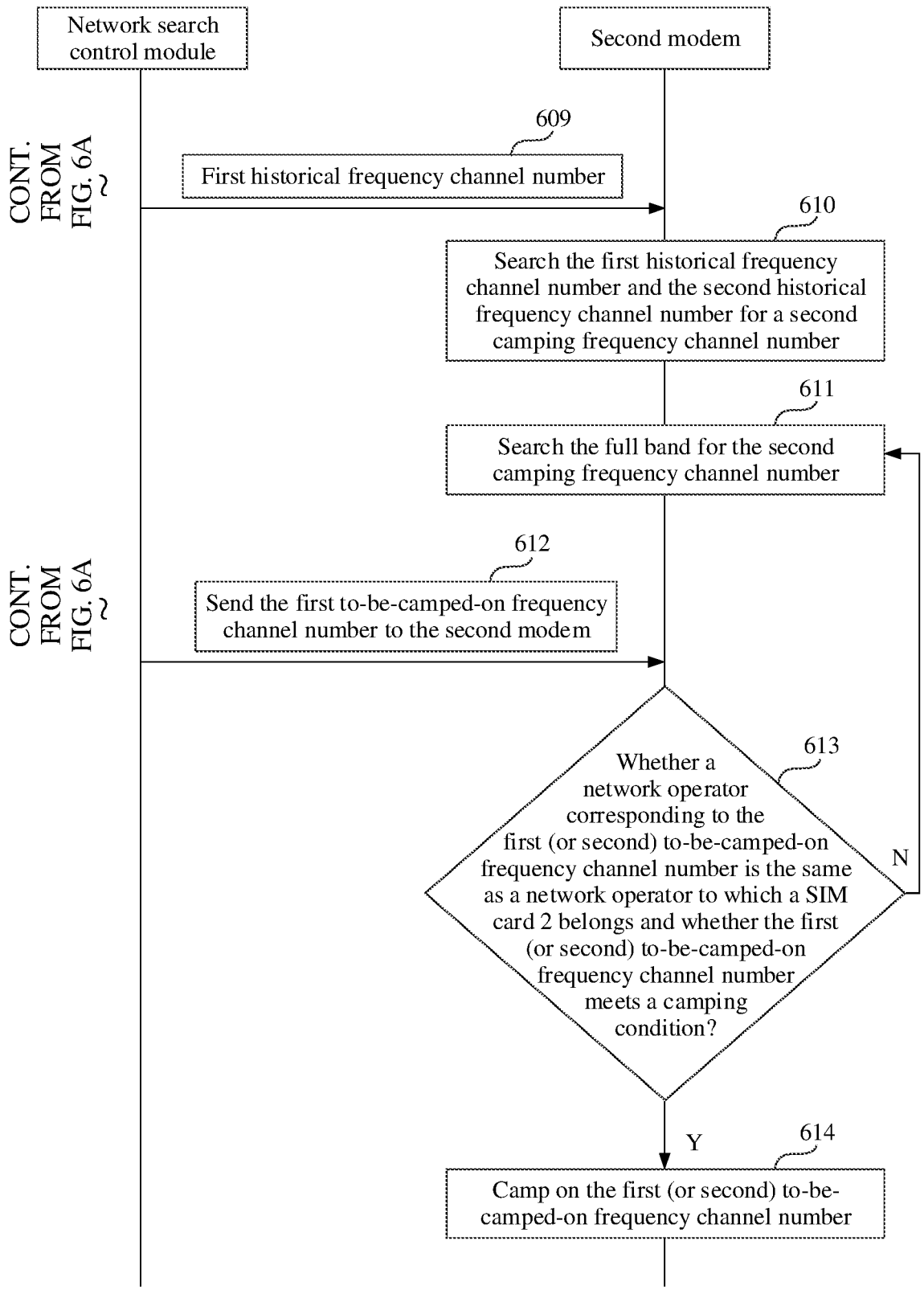
FIG. 6B is another schematic flowchart of searching for a network by a terminal according to an embodiment.

FIG. 5 shows an example of another method for searching for a network by a terminal according to an embodiment. The method may include the following steps:

In step 501, the terminal controls a first wireless communications module to search frequency channel numbers included in a historical frequency channel number set for a first camping frequency channel number, and controls a second wireless communications module to search the frequency channel numbers included in the historical frequency channel number set for a second camping frequency channel number, where the historical frequency channel number set includes a first historical frequency channel number and a second historical frequency channel number.

In step 502, if the first wireless communications module fails to search the frequency channel numbers included in the historical frequency channel number set for the first camping frequency channel number, the terminal controls the first wireless communications module to search a full band for the first camping frequency channel number; and if the second wireless communications module fails to search the frequency channel numbers included in the historical frequency channel number set for the second camping frequency channel number, the terminal controls the second wireless communications module to search the full band for the second camping frequency channel number.

In step 503, if the first wireless communications module finds, in step 501 or step 502, the first to-be-camped-on frequency channel number that meets a preset condition, the terminal shares the first to-be-camped-on frequency channel number with the second wireless communications module; and if the second wireless communications module finds, in step 501 or step 502, a second to-be-camped-on frequency channel number that meets a preset condition, the terminal shares the second to-be-camped-on frequency channel number with the first wireless communications module, where the first to-be-camped-on frequency channel number may be used as a frequency channel number when the second wireless communications module subsequently camps on a cell or accesses a network, and the second to-be-camped-on frequency channel number may be used as a frequency channel number when the first wireless communications module subsequently camps on a cell or accesses a network.

In the prior art, before a first modem searches for a first camping frequency channel number and before a second modem searches for a second camping frequency channel number, the first modem and the second modem do not share information about their respective historical frequency channel numbers with each other. Therefore, if the two modems do not find their respective camping frequency channel numbers after searching their respective historical frequency channel numbers, the two modems both search a full band. However, the full band includes a plurality of bands and standards, and consequently it takes a very long time to search for a camping frequency channel number. Compared with the prior-art network search solution, in this embodiment, before searching for the first camping frequency channel number, the first modem may obtain the second historical frequency channel number shared by the terminal, so that a time for searching for the first camping frequency channel number by the first modem can be shortened. In addition, before searching for the second camping frequency channel number, the second modem may obtain the first historical frequency channel number shared by the terminal, so that a time for searching for the first camping frequency channel number by the first modem can be shortened.

In an example, that the first wireless communications module finds the first to-be-camped-on frequency channel number that meets the preset condition, and shares the first to-be-camped-on frequency channel number with the second wireless communications module is used as an example. Step 503 may be implemented in the following several optional implementations such as an exemplary embodiment c1, an embodiment c2, and an embodiment c3.

In embodiment c1, the first wireless communications module finds the first camping frequency channel number from the frequency channel numbers included in the historical frequency channel number set, and if a network operator corresponding to the first camping frequency channel number is the same as a network operator corresponding to the second wireless communications module, the terminal shares the first camping frequency channel number with the second wireless communications module.

In embodiment c2, the first wireless communications module finds the first to-be-camped-on frequency channel number that meets the preset condition from the full band, and the terminal shares the first to-be-camped-on frequency channel number with the second wireless communications module. Optionally, before sharing the first to-be-camped-on frequency channel number with the second wireless communications module, the terminal may first determine whether a network operator corresponding to the first to-be-camped-on frequency channel number is the same as a network operator corresponding to the second wireless communications module. If the network operator corresponding to the first to-be-camped-on frequency channel number is the same as the network operator corresponding to the second wireless communications module, the terminal shares the first to-be-camped-on frequency channel number with the second wireless communications module. If the network operator corresponding to the first to-be-camped-on frequency channel number is different from the network operator corresponding to the second wireless communications module, the terminal does not share the first to-be-camped-on frequency channel number with the second wireless communications module.

The foregoing embodiments c1 and c2 may be applied to a scenario in which a network operator corresponding to the first wireless communications module is the same as the network operator corresponding to the second wireless communications module, or may be applied to a scenario in which a network operator corresponding to the first wireless communications module is different from the network operator corresponding to the second wireless communications module.

In embodiment c3, a network operator corresponding to the first wireless communications module is the same as a network operator corresponding to the second wireless communications module. If the first wireless communications module finds the first camping frequency channel number from the frequency channel numbers included in the historical frequency channel number set, or finds the first to-be-camped-on frequency channel number that meets the preset condition from the full band, the terminal may directly share the first to-be-camped-on frequency channel number with the second wireless communications module, so that the second wireless communications module camps on the first camping frequency channel number or the first to-be-camped-on frequency channel number.

In the foregoing embodiments c1, c2, and c3, the terminal shares the first camping frequency channel number or the first to-be-camped-on frequency channel number that is found by the first wireless communications module with the second wireless communications module. Correspondingly, the second wireless communications module receives the first camping frequency channel number or the first to-be-camped-on frequency channel number. It may be determined, based on whether the second wireless communications module has camped on a frequency channel number currently, whether the second wireless communications module camps on the received first camping frequency channel number or the received first to-be-camped-on frequency channel number. For an exemplary implementation, refer to the example in the embodiment b3. Details are not described herein again.

In this embodiment, that the first modem searches for the first camping frequency channel number is used as an example. The first modem needs to search for a network based on a network search policy. Optionally, the network search policy may be preconfigured in the first modem and the second modem, or may be sent by a network search control module when the first modem has a network search requirement.

For example, the network search policy includes policies of two phases. A policy of a first phase is as follows: The first modem searches the first historical frequency channel number and the second historical frequency channel number for the first camping frequency channel number, and if the first modem fails to search for the first camping frequency channel number, the first modem searches for the first camping frequency channel number based on a policy of a second phase. The policy of the second phase is as follows: The first modem searches the full band for the first camping frequency channel number. Optionally, the network search policy may alternatively include only the policy of the first phase or the policy of the second phase in this example.

To distinguish a prior-art network search solution from that in this embodiment, it is assumed that the first historical frequency channel number includes a frequency channel number A, a frequency channel number E, and a frequency channel number F, the second historical frequency channel number includes the frequency channel number A, a frequency channel number D, and the frequency channel number F, and the full band includes the frequency channel number A, a frequency channel number B, a frequency channel number C, the frequency channel number D, the frequency channel number E, and the frequency channel number F. That the first modem searching for a network is used as an example, and an example a and an example b in the following are used for exemplary descriptions.

In example a, in the prior-art network search solution, the first modem first searches the frequency channel number A, the frequency channel number E, and the frequency channel number F for the first camping frequency channel number. Assuming that the first modem does not find the first camping frequency channel number after searching the frequency channel number A, the frequency channel number E, and the frequency channel number F, the first modem searches the frequency channel numbers included in the full band for the first camping frequency channel number. It is assumed that the first camping frequency channel number first found by the first modem is the frequency channel number D in the entire process of the example a.

In example b, in the network search solution in this embodiment, the first modem first searches the first historical frequency channel number and the second historical frequency channel number for the first camping frequency channel number, that is, searches the frequency channel number A, the frequency channel number D, the frequency channel number E, and the frequency channel number F for the first camping frequency channel number. The first modem may find the first camping frequency channel number, that is, the frequency channel number D, in a phase of searching the known historical frequency channel numbers for the camping frequency channel number, and camp on the frequency channel number D, instead of finding the frequency channel number D until the first modem searches the frequency channel numbers included in the full band for the first camping frequency channel number. In this way, compared with the example a, the first modem may find the first camping frequency channel number more quickly in the example b.

FIG. 6A and FIG. 6B show an example of another method for searching for a network by a terminal according to an embodiment. The method may include the following steps.

In step 601, a network search control module sends a second historical frequency channel number to a first modem, where the second historical frequency channel number is a frequency channel number that meets a camping condition and that is historically found by a second modem.

In step 602, the first modem searches a first historical frequency channel number and the second historical frequency channel number for a first camping frequency channel number, where the first historical frequency channel number is a frequency channel number that meets a camping condition and that is historically found by the first modem.

In step 603, the first modem determines whether a first to-be-camped-on frequency channel number that meets a preset condition is found; and if the first to-be-camped-on frequency channel number that meets the preset condition is found, the first modem performs step 604 and step 608; or if the first to-be-camped-on frequency channel number that meets the preset condition is not found, the first modem performs step 602.

In step 604, the first modem determines whether a network operator corresponding to the first to-be-camped-on frequency channel number is the same as a network operator to which a SIM card 1 belongs, and whether the first to-be-camped-on frequency channel number meets a camping condition; and if the network operator corresponding to the first to-be-camped-on frequency channel number is the same as the network operator to which the SIM card 1 belongs, and the first to-be-camped-on frequency channel number meets the camping condition, the first modem performs step 605; or if the network operator corresponding to the first to-be-camped-on frequency channel number is different from the network operator to which the SIM card 1 belongs, and the first to-be-camped-on frequency channel number does not meet the camping condition, the first modem performs step 606.

In step 605, the first modem camps on the first to-be-camped-on frequency channel number.

In step 606, whether the first modem has searched all frequency channel numbers in the first historical frequency channel number and the second historical frequency channel number is determined; and if the first modem has searched all the frequency channel numbers in the first historical frequency channel number and the second historical frequency channel number, step 607 is performed; or if the first modem has not searched all the frequency channel numbers in the first historical frequency channel number and the second historical frequency channel number, step 602 is performed.

In step 602, the first modem searches each of frequency channel numbers included in the first historical frequency channel number and the second historical frequency channel number for the first camping frequency channel number. For example, it is assumed that five frequency channel numbers included in the first historical frequency channel number and the second historical frequency channel number are a frequency channel number A, a frequency channel number B, a frequency channel number C, a frequency channel number D, and a frequency channel number E. For the frequency channel number A, the first modem performs step 602 to step 606. Then, similar to the frequency channel number A, for each of the frequency channel number B, the frequency channel number C, the frequency channel number D, and the frequency channel number E, the first modem performs step 602 to step 606. Next, the first modem performs step 607.

In step 607, the first modem searches a full band for a first camping frequency channel number. After step 607, the first modem may perform steps 603 to 606. Details are not described herein again.

In step 608, the first modem sends the first to-be-camped-on frequency channel number to the network search control module.

It should be noted that there is no sequence of performing step 604 and step 608. The example shown in FIG. 5 further includes the following steps 609 to 611. There is no sequence of performing any one of steps 609 to 611 and any one of steps 612 to 614.

In step 609, the network search control module sends the first historical frequency channel number to a second modem.

In step 610, the second modem searches the first historical frequency channel number and the second historical frequency channel number for a second camping frequency channel number. After step 610, steps 603 to 606 and step 608 may be performed. Details are not described herein again. When the second modem fails to search the first historical frequency channel number and the second historical frequency channel number for the second camping frequency channel number, step 611 is performed.

In step 611, the second modem searches the full band for the second camping frequency channel number. After step 707, the second modem may further perform steps 603 to 606. Details are not described herein again. If a second to-be-camped-on frequency channel number is found in step 611, step 613 is performed.

After the search control module receives the first to-be-camped-on frequency channel number sent in step 608, the terminal performs steps 612 to 614.

In step 612, the network search control module sends the first to-be-camped-on frequency channel number to the second modem.

In step 613, the second modem determines whether a network operator corresponding to the first (or second) to-be-camped-on frequency channel number is the same as a network operator to which a SIM card 2 belongs, and whether the first (or second) to-be-camped-on frequency channel number meets a camping condition; and if the network operator corresponding to the first (or second) to-be-camped-on frequency channel number is the same as the network operator to which the SIM card 2 belongs, and the first (or second) to-be-camped-on frequency channel number meets the camping condition, the second modem performs step 614; or if the network operator corresponding to the first (or second) to-be-camped-on frequency channel number is different from the network operator to which the SIM card 2 belongs, and the first (or second) to-be-camped-on frequency channel number does not meet the camping condition, the second modem performs step 610 or step 611, or ends network search.

In step 614, the second modem camps on the first (or second) to-be-camped-on frequency channel number.

It should be noted that there is no sequence of performing any one of steps 604 to 607 and any one of steps 612 to 614.

In the solution in this embodiment, a first wireless communications module may search both the first historical frequency channel number of the first wireless communications module and the second historical frequency channel number for the first camping frequency channel number. Compared with the prior art in which the first wireless communications module searches only the first historical frequency channel number for the first camping frequency channel number, in this embodiment, the first wireless communications module searches for a network based on more pieces of known frequency channel number information, so that a time for searching for the first camping frequency channel number by the first wireless communications module can be shortened. Correspondingly, a second wireless communications module also first searches the first historical frequency channel number and the second historical frequency channel number for the second camping frequency channel number, so that a time for searching for the second camping frequency channel number by the second wireless communications module can be shortened.

Based on the same technical concept, an embodiment further provides a terminal, configured to implement the method performed by the terminal in the foregoing method embodiment.

Figure 7:
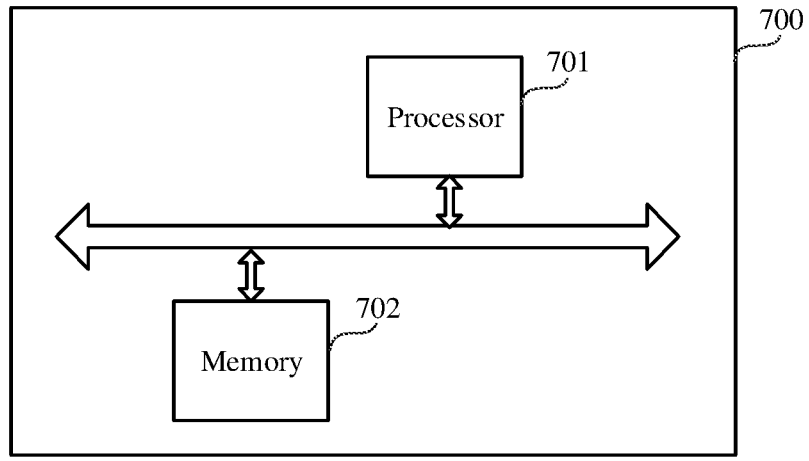
FIG. 7 is a schematic structural diagram of a terminal according to an embodiment.

FIG. 7 is a schematic structural diagram of an example of a terminal according to an embodiment. As shown in FIG. 7, the terminal 700 includes a processor 701 and a memory 702, and the processor 701 may include a first wireless communications module and a second wireless communications module. The processor 701 and the memory 702 may be connected to each other by using a bus.

The processor 701 may be a central processing unit (CPU), a network processor, or a combination of a CPU and a network processor. The processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof.

The memory 702 is configured to store a software instruction and data, and the data may include frequency channel number information. The processor 701 may invoke the stored program instruction, to perform one or more steps or optional implementations in the embodiment shown in the foregoing solution. Optionally, the processor 701 and the memory 702 may be integrated.

In an exemplary embodiment, the processor 701 is configured to read the software instruction in the memory 702, to implement the following operations: controlling the first wireless communications module to search a first band for a first camping frequency channel number, and controlling the second wireless communications module to search a second band for a second camping frequency channel number; and sharing, if the first wireless communications module finds a to-be-camped-on frequency channel number that meets a preset condition, the to-be-camped-on frequency channel number with the second wireless communications module.

In a possible embodiment, the processor 701 is further configured to read the program instruction in the memory, to implement the following operations: controlling the first wireless communications module to search frequency channel numbers included in a historical frequency channel number set for the first camping frequency channel number, and controlling the second wireless communications module to search the frequency channel numbers included in the historical frequency channel number set for the second camping frequency channel number, where the historical frequency channel number set includes a first historical frequency channel number of the first wireless communications module and a second historical frequency channel number of the second wireless communications module.

In a possible embodiment, the processor 701 is further configured to read the program instruction in the memory, to implement the following operation: sharing the second historical frequency channel number with the first wireless communications module.

In a possible embodiment, the controlling the first wireless communications module to search a first band for a first camping frequency channel number includes: if the first wireless communications module fails to search the frequency channel numbers included in the historical frequency channel number set for the first camping frequency channel number, controlling the first wireless communications module to search the first band for the first camping frequency channel number.

In a possible embodiment, the processor 701 is further configured to read the program instruction in the memory, to implement the following operation: sharing the first historical frequency channel number with the second wireless communications module.

In a possible embodiment, the controlling the second wireless communications module to search a second band for a second camping frequency channel number includes: if the second wireless communications module fails to search the frequency channel numbers included in the historical frequency channel number set for the second camping frequency channel number, controlling the second wireless communications module to search the second band for the second camping frequency channel number.

In a possible embodiment, if the first wireless communications module finds a to-be-camped-on frequency channel number that meets a preset condition, the sharing the to-be-camped-on frequency channel number with the second wireless communications module includes: if the first wireless communications module finds the to-be-camped-on frequency channel number that meets the preset condition, sharing the to-be-camped-on frequency channel number with the second wireless communications module when determining that a network operator corresponding to the to-be-camped-on frequency channel number is the same as a network operator corresponding to the second wireless communications module.

In a possible embodiment, if the first wireless communications module finds a to-be-camped-on frequency channel number that meets a preset condition, the sharing the to-be-camped-on frequency channel number with the second wireless communications module includes: if a network operator corresponding to the first wireless communications module is the same as a network operator corresponding to the second wireless communications module, sharing the first camping frequency channel number with the second wireless communications module when the first wireless communications module finds the first camping frequency channel number, to serve as the second camping frequency channel number of the second wireless communications module.

In a possible embodiment, the processor 701 is further configured to read the program instruction in the memory, to implement the following operation: if the first camping frequency channel number meets a frequency channel number switching condition, switching the second wireless communications module to the first camping frequency channel number, where the frequency channel number switching condition includes: quality of a signal received by the second wireless communications module on a frequency channel number on which the second wireless communications module currently camps is lower than quality of a signal received on the first camping frequency channel number.

In a possible embodiment, the processor 701 further includes a network search control module; and if the first wireless communications module finds a to-be-camped-on frequency channel number that meets a preset condition, the sharing the to-be-camped-on frequency channel number with the second wireless communications module includes: if the first wireless communications module finds the to-be-camped-on frequency channel number that meets the preset condition, sharing the to-be-camped-on frequency channel number with the second wireless communications module by using the network search control module.

In a possible embodiment, the first band is an FDD band, and the second band is a TDD band.

In a possible embodiment, the first band is a sub-6 GHz band (sub-6 GHz bands), and the second band is a millimeter wave band.

A person skilled in the art may understand that, for ease of description, FIG. 7 shows only one memory and only one processor. An actual terminal device may include a plurality of processors and a plurality of memories. The memory may also be referred to as a storage medium, a storage device, or the like. This is not limited in this embodiment.

Figure 8:
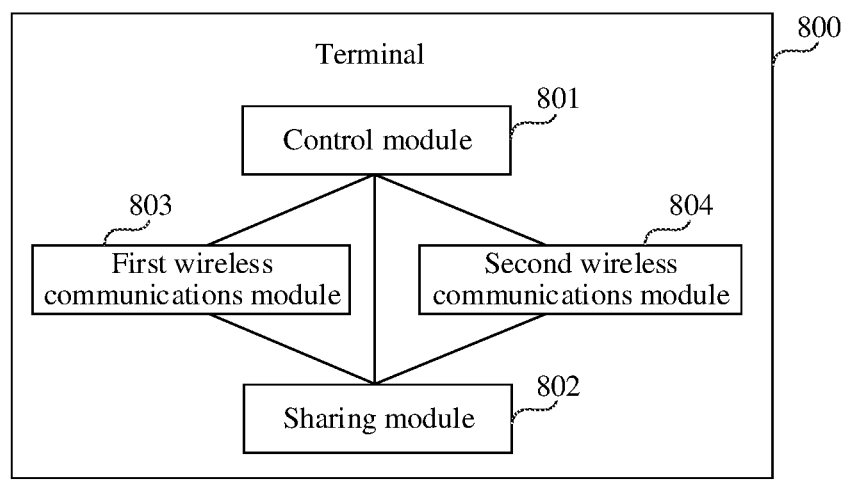
FIG. 8 is a schematic structural diagram of another terminal according to an embodiment.

Based on the foregoing content and the same concept, this embodiment provides a terminal 800, configured to perform the foregoing method. FIG. 8 is a schematic structural diagram of an example of a terminal according to this embodiment. As shown in FIG. 8, the terminal 800 includes a control module 801, a sharing module 802, a first wireless communications module 803, and a second wireless communications module 804.

The control module 801 is configured to: control the first wireless communications module 803 to search a first band for a first camping frequency channel number, and control the second wireless communications module 804 to search a second band for a second camping frequency channel number. The sharing module 802 is configured to: if a to-be-camped-on frequency channel number that meets a preset condition and that is found by the first wireless communications module 803 is received, share the to-be-camped-on frequency channel number with the second wireless communications module 804.

It should be understood that division of the modules in the foregoing terminal is merely division of logical functions, and during actual implementation, some or all of the modules may be integrated into one physical entity, or may be physically separated. In this embodiment, the control module 801 and the sharing module 802 in FIG. 8 may be implemented by the processor 701 in FIG. 7. In other words, the control module 801 and the sharing module 802 in this embodiment may perform the solution performed by the processor 701 in FIG. 7. For other content, refer to the foregoing content. Details are not described herein again.

All or some of the foregoing embodiments may be implemented by using software, hardware (for example, a circuit), firmware, or any combination thereof. When software is used to implement the embodiments, the embodiments may be implemented completely or partially in a form of a computer program product. The computer program product includes one or more computer instructions. When the computer program instructions are loaded or executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk (SSD)), or the like.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of the present invention without departing from the spirit and scope. The exemplary embodiments are intended to cover these modifications and variations provided that they fall within the scope of protection defined by the following claims and their equivalent technologies.

What is claimed is:

1. A method for searching for a network, implemented by a terminal including a first wireless communications module and a second wireless communications module, the method comprising:
controlling the first wireless communications module to search for a first camping frequency channel number, wherein before searching for the first camping frequency channel number, the first wireless communication module obtains the second historical frequency channel number shared by the terminal;
controlling the second wireless communications module to search for a second camping frequency channel number, wherein before searching for the second camping frequency channel number, the second wireless communication module obtains the first historical frequency channel number shared by the terminal;
sharing the first camping frequency channel number with the second wireless communications module;
sharing the second camping frequency channel number with the first wireless communications module; and
if the first camping frequency channel number meets a frequency channel number switching condition, switching the second wireless communications module to the first camping frequency channel number, wherein the frequency channel number switching condition comprises: quality of a signal received by the second wireless communications module on a frequency channel number on which the second wireless communications module currently camps is lower than quality of a signal received on the first camping frequency channel number.

2. The method according to claim 1, wherein the first camping frequency channel number meets a preset condition, and wherein the second camping frequency channel number meets the preset condition.

3. The method according to claim 1, wherein controlling the first wireless communications module to search for the first camping frequency channel number comprises:
controlling the first wireless communications module to search frequency channel numbers comprised in a historical frequency channel number set for the first camping frequency channel number.

4. The method according to claim 3, wherein controlling the second wireless communications module to search for the second camping frequency channel number comprises:
controlling the second wireless communications module to search the frequency channel numbers comprised in the historical frequency channel number set for the second camping frequency channel number, wherein the historical frequency channel number set comprises a first historical frequency channel number of the first wireless communications module and a second historical frequency channel number of the second wireless communications module.

5. The method according to claim 4, further comprising:
sharing the second historical frequency channel number with the first wireless communications module; and
sharing the first historical frequency channel number with the second wireless communications module.

6. The method according to claim 1, wherein the sharing of the first camping frequency channel number with the second wireless communications module comprises:
sharing the first camping frequency channel number with the second wireless communications module when determining that a network operator corresponding to the first camping frequency channel number is the same as a network operator corresponding to the second wireless communications module.

7. A terminal, comprising a first wireless communications module and a second wireless communications module, wherein the terminal is configured to implement the following operations:
controlling the first wireless communications module to search for a first camping frequency channel number, wherein before searching for the first camping frequency channel number, the first wireless communication module obtains the second historical frequency channel number shared by the terminal;
controlling the second wireless communications module to search for a second camping frequency channel number, wherein before searching for the second camping frequency channel number, the second wireless communication module obtains the first historical frequency channel number shared by the terminal;
sharing the first camping frequency channel number with the second wireless communications module;
sharing the second camping frequency channel number with the first wireless communications module; and
if the first camping frequency channel number meets a frequency channel number switching condition, switching the second wireless communications module to the first camping frequency channel number, wherein the frequency channel number switching condition comprises: quality of a signal received by the second wireless communications module on a frequency channel number on which the second wireless communications module currently camps is lower than quality of a signal received on the first camping frequency channel number.

8. The terminal according to claim 7, wherein the first camping frequency channel number meets a preset condition, and wherein the second camping frequency channel number meets the preset condition.

9. The terminal according to claim 7, wherein the controlling of the first wireless communications module to search for the first camping frequency channel number comprises:
controlling the first wireless communications module to search frequency channel numbers comprised in a historical frequency channel number set for the first camping frequency channel number.

10. The terminal according to claim 9, wherein the controlling of the second wireless communications module to search for the second camping frequency channel number comprises:
controlling the second wireless communications module to search the frequency channel numbers comprised in the historical frequency channel number set for the second camping frequency channel number, wherein the historical frequency channel number set comprises a first historical frequency channel number of the first wireless communications module and a second historical frequency channel number of the second wireless communications module.

11. The terminal according to claim 10, wherein the terminal is further configured to implement the following operations:
- sharing the second historical frequency channel number with the first wireless communications module; and
- sharing the first historical frequency channel number with the second wireless communications module.

12. The terminal according to claim 7, wherein the sharing of the first camping frequency channel number with the second wireless communications module comprises:
- sharing the first camping frequency channel number with the second wireless communications module when determining that a network operator corresponding to the first camping frequency channel number is the same as a network operator corresponding to the second wireless communications module.

13. A computer program product comprising computer-executable instructions that are stored on a non-transitory computer-readable medium and that, when executed by a processor, are configured to cause a terminal comprising a first wireless communications module and a second wireless communications module to perform the following operations:
- controlling the first wireless communications module to search for a first camping frequency channel number, wherein before searching for the first camping frequency channel number, the first wireless communication module obtains the second historical frequency channel number shared by the terminal;
- controlling the second wireless communications module to search for a second camping frequency channel number, wherein before searching for the second camping frequency channel number, the second wireless communication module obtains the first historical frequency channel number shared by the terminal;
- sharing the first camping frequency channel number with the second wireless communications module;
- sharing the second camping frequency channel number with the first wireless communications module; and
- if the first camping frequency channel number meets a frequency channel number switching condition, switching the second wireless communications module to the first camping frequency channel number, wherein the frequency channel number switching condition comprises: quality of a signal received by the second wireless communications module on a frequency channel number on which the second wireless communications module currently camps is lower than quality of a signal received on the first camping frequency channel number.

14. The computer program product according to claim 13, wherein the first camping frequency channel number meets a preset condition, and wherein the second camping frequency channel number meets the preset condition.

15. The computer program product according to claim 13, wherein the controlling of the first wireless communications module to search for the first camping frequency channel number comprises:
- controlling the first wireless communications module to search frequency channel numbers comprised in a historical frequency channel number set for the first camping frequency channel number.

16. The computer program product according to claim 15, wherein the controlling of the second wireless communications module to search for the second camping frequency channel number comprises:
- controlling the second wireless communications module to search the frequency channel numbers comprised in the historical frequency channel number set for the second camping frequency channel number, wherein the historical frequency channel number set comprises a first historical frequency channel number of the first wireless communications module and a second historical frequency channel number of the second wireless communications module.

17. The computer program product according to claim 16, wherein the operations performed by the terminal further comprise:
- sharing the second historical frequency channel number with the first wireless communications module; and
- sharing the first historical frequency channel number with the second wireless communications module.

18. The computer program product according to claim 13, wherein the sharing of the first camping frequency channel number with the second wireless communications module comprises:
- sharing the first camping frequency channel number with the second wireless communications module when determining that a network operator corresponding to the first camping frequency channel number is the same as a network operator corresponding to the second wireless communications module.

* * * * *